(12) United States Patent
Okura et al.

(10) Patent No.: US 11,637,982 B2
(45) Date of Patent: Apr. 25, 2023

(54) SOLID-STATE IMAGING DEVICE, METHOD FOR DRIVING SOLID-STATE IMAGING DEVICE, AND ELECTRONIC APPARATUS

(71) Applicants: Brillnics Japan Inc., Tokyo (JP); THE RITSUMEIKAN TRUST, Kyoto (JP)

(72) Inventors: Shunsuke Okura, Tokyo (JP); Masayoshi Shirahata, Shiga (JP); Takeshi Fujino, Shiga (JP); Mitsuru Shiozaki, Shiga (JP); Takaya Kubota, Shiga (JP)

(73) Assignees: BRILLNICS JAPAN INC., Tokyo (JP); THE RITSUMEIKAN TRUST, Kyoto (JP)

( * ) Notice: Subject to any disclaimer, the term of this patent is extended or adjusted under 35 U.S.C. 154(b) by 332 days.

(21) Appl. No.: 16/963,166

(22) PCT Filed: Jan. 18, 2019

(86) PCT No.: PCT/JP2019/001423
§ 371 (c)(1),
(2) Date: Jul. 17, 2020

(87) PCT Pub. No.: WO2019/142898
PCT Pub. Date: Jul. 25, 2019

(65) Prior Publication Data
US 2021/0127080 A1    Apr. 29, 2021

(30) Foreign Application Priority Data
Jan. 22, 2018    (JP) .............................. JP2018-008400

(51) Int. Cl.
*H04N 5/378*    (2011.01)
*H01L 27/146*    (2006.01)
(Continued)

(52) U.S. Cl.
CPC ....... *H04N 5/378* (2013.01); *H01L 27/14609* (2013.01); *H01L 27/14643* (2013.01);
(Continued)

(58) Field of Classification Search
CPC ........ H04N 5/378; H04N 5/347; H04N 5/367; H04N 5/374; H04N 5/335; H04N 1/028;
(Continued)

(56) References Cited

U.S. PATENT DOCUMENTS

| 10,218,517 B2 * | 2/2019 | Mai ........................ H04L 9/3278 |
| 2018/0115723 A1 * | 4/2018 | Takayanagi ....... H01L 27/14609 |
| 2018/0183614 A1 * | 6/2018 | Danger ................. H04L 9/0866 |

FOREIGN PATENT DOCUMENTS

WO    20161/67076 A1    3/2018

OTHER PUBLICATIONS

Lao et al., "Efficient Fuzzy Extractor Implementations for PUF Based Authentication", Oct. 2017, 2017 12th International Conference on Malicious and Unwanted Software (MALWARE), pp. 119-125 (Year: 2017).*
(Continued)

*Primary Examiner* — Albert H Cutler
(74) *Attorney, Agent, or Firm* — Pillsbury Winthrop Shaw Pittman LLP

(57) ABSTRACT

A solid-state imaging device includes a pixel part, a reading part for reading a pixel signal from the pixel part and a response data generating part including a fuzzy extractor. The response data generating part generates response data including a unique key in association with at least one selected from among variation information of pixels and variation information of the reading part. The response data generating part generates, when regenerating a key, a unique key using helper data acquired in generation of an initial key, variation information acquired in the regeneration of the key,
(Continued)

and reliability information determined based on the variation information acquired in the regeneration of the key.

15 Claims, 39 Drawing Sheets

(51) Int. Cl.
| | |
|---|---|
| *H04N 5/347* | (2011.01) |
| *H04N 5/367* | (2011.01) |
| *H04N 5/374* | (2011.01) |
| *H04N 5/335* | (2011.01) |
| *G09C 5/00* | (2006.01) |
| *H04N 9/10* | (2006.01) |
| *H04N 1/028* | (2006.01) |

(52) U.S. Cl.
CPC ............ *H04N 5/347* (2013.01); *H04N 5/367* (2013.01); *H04N 5/374* (2013.01)

(58) Field of Classification Search
CPC ........ H01L 27/14609; H01L 27/14643; G09C 5/00; H04L 9/10
See application file for complete search history.

(56) References Cited

OTHER PUBLICATIONS

Okura et al., A Proposal of PUF Utilizing Pixel Variations in the CMOS Image Sensor, 2017 Symposium on Cryptography and Information Security, Jan. 24-27, 2017, pp. 66-69, The Institute of Electronics, Information and Communication Engineers, Naha, Japan.

Nakura et al., A Proposal of PUF utilizing Pixel Variations in the CMOS Image Sensor (2)-PUF Performance Evaluation with Measured Data-, 2017 Symposium on Cryptography and Information Security, Jan. 24-27, 2017, pp. 1-8, The Institute of Electronics, Information and Communication Engineers, Naha, Japan. (English Summary).

Lim et al., Extracting Secret Keys From Integrated Circuits, IEEE Transactions on Very Large Scale Integration (VLSI) Systems, Oct. 2005, pp. 1200-1205, vol. 13(10).

Suh et al., Physical Unclonable Functions for Device Authentication and Secret Key Generation, DAC 2007, Jun. 4-8, 2007, pp. 9-14, San Diego, California, USA.

Dodis et al., Fuzzy Extractors: How to Generate Strong Keys from Biometrics and Other Noisy Data, Eurocrypt, LNCS 3027, 2004, pp. 523-540.

Taniguchi et al., A Soft-Decision Fuzzy Extractor for Increasing Reliability of Physical Unclonable Function Responses, IEICE Technical Report IT2012-52, Jan. 2013, pp. 1-6, The Institute of Electronics, Information and Communication Engineers. (English Abstract).

Patent Cooperation Treaty, International Search Report for PCT/JP2019/001423, dated Apr. 23, 2019, pp. 1-2.

Patent Cooperation Treaty, Written Opinion issued for PCT/JP2019/001423, dated Apr. 23, 2019, pp. 1-16.

Ishiki et al., Error Bit Analysis and Countermeasure Method of CIS-PUF, 2017 IEICE General Meeting, Mar. 22-25, 2017, pp. 1-10, Nagoya, Japan.

* cited by examiner

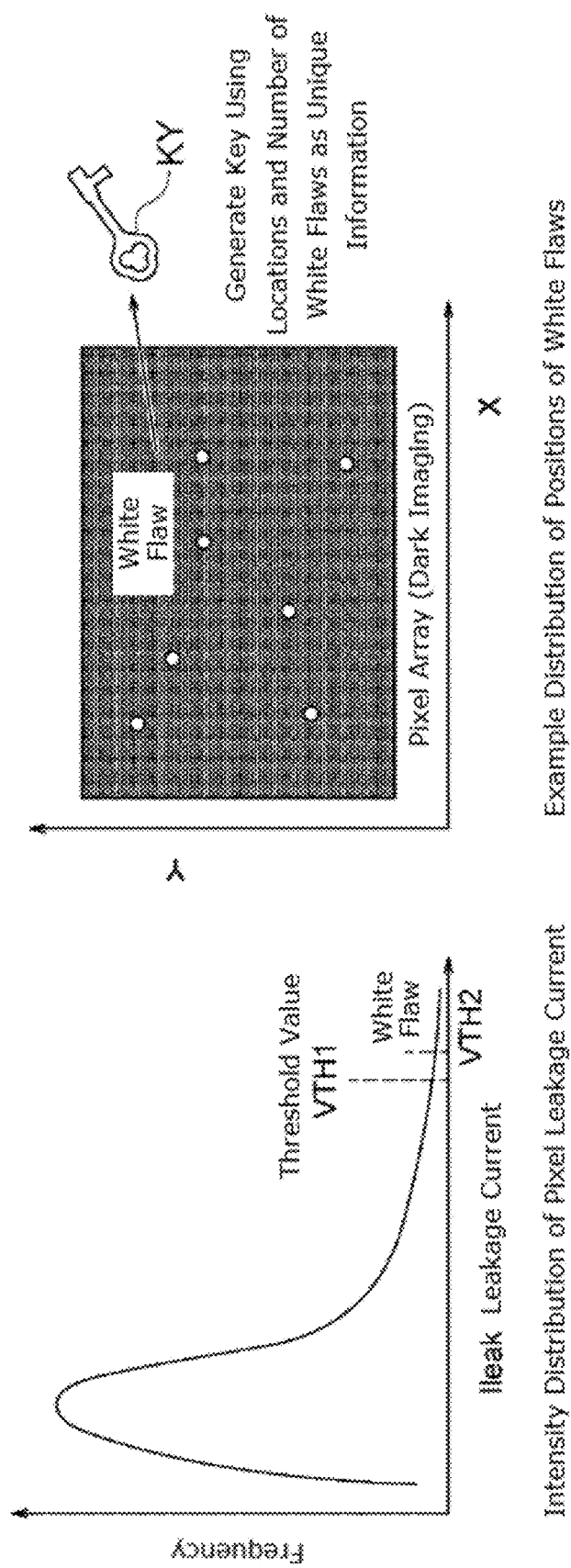

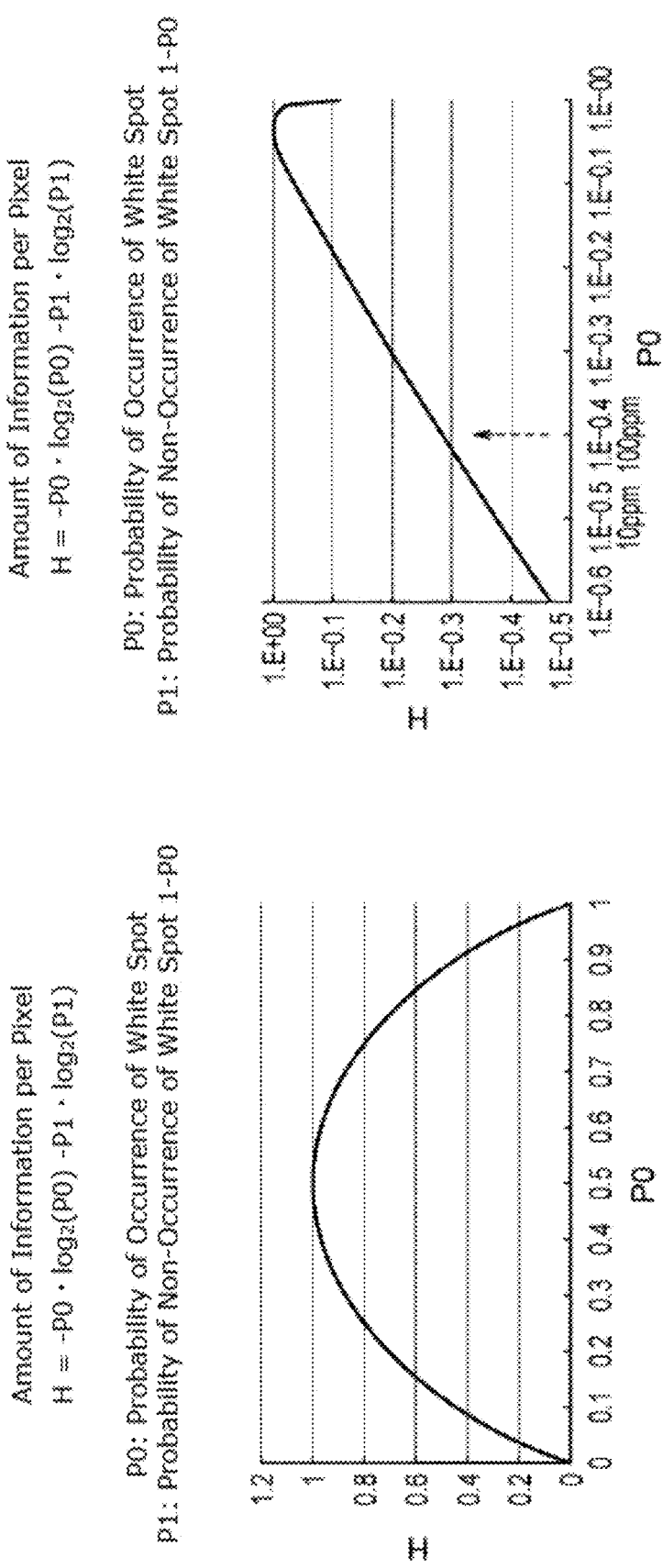

Fig. 9A
Fig. 9B

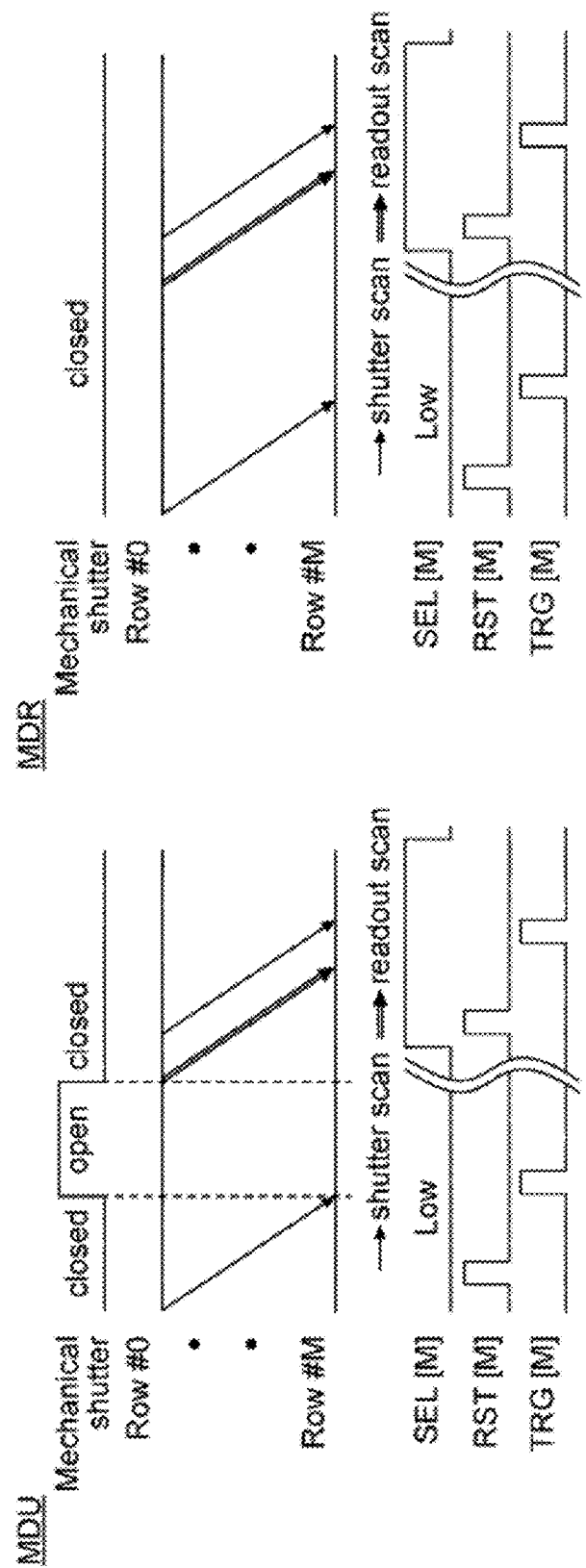

Concept of Key Pattern Obtained
by Binarizing Variation
Information

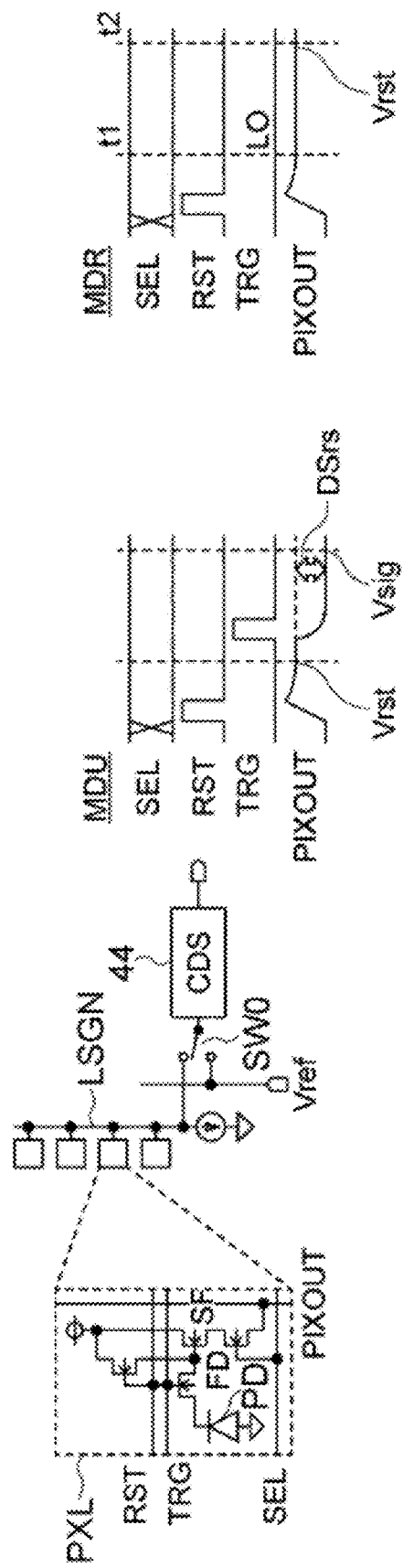

Concept of Key Pattern
Obtained by Binarizing
Variation Information

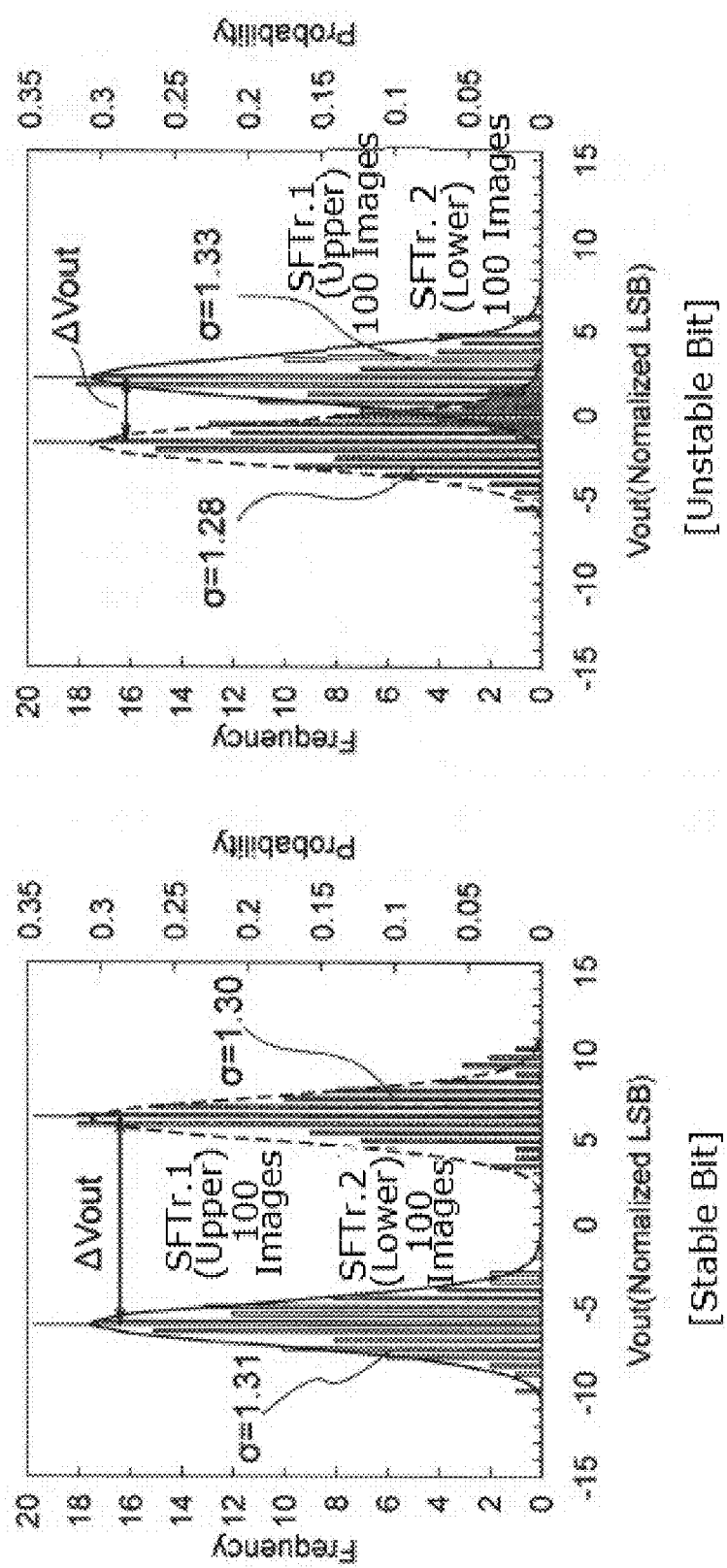

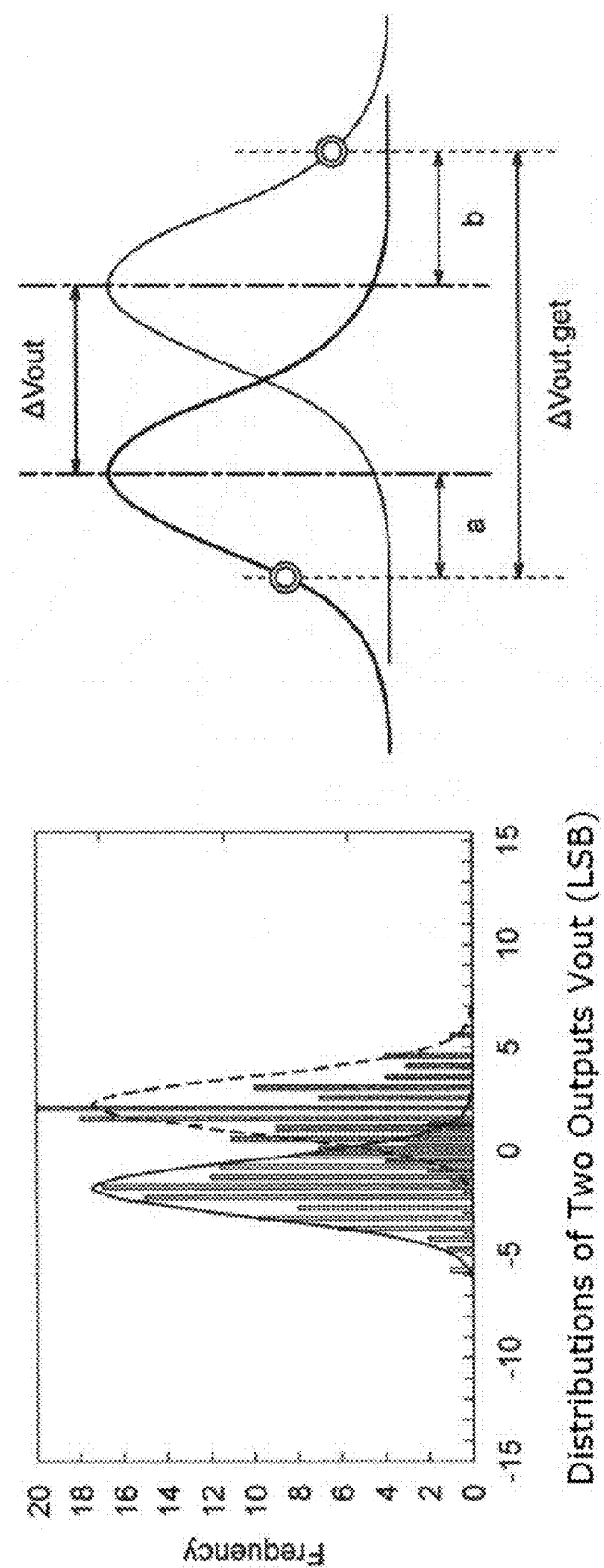

Example of Reliability (Reliability Score Ranges from 1 to 5)

5: Stable Bit Highly Unlikely to Produce Error

1: Unstable Bit Highly Likely to Produce Error

Decoding (When Code Including Error is Input)

| No Reliability $a=(+1, +1, +1, -1)$ | With Reliability $b=(+5, +1, +5, -5)$ |
|---|---|

Code Candidates $x=(+1,-1,+1,-1)$, $y=(+1,+1,+1,+1)$ $a \otimes x=(+1, -1, +1, +1)$
$\text{Sum}(a \otimes x)=2$
$a \otimes y=(+1, +1, +1, -1)$
$\text{Sum}(a \otimes y)=2$ Two Produce Same Value →
Correct Code is not Known $b \otimes x=(+5, -1, +5, +5)$
$\text{Sum}(b \otimes x)=14$
$b \otimes y=(+5, +1, +5, -5)$
$\text{Sum}(b \otimes y)=6$ ① Produces Larger Value →
① is Judged as Correct Code Correlation Decoding

Correct Code

| -1 | 1 | 1 | -1 | 1 | -1 | -1 | 1 |
|---|---|---|---|---|---|---|---|

$\vec{v}$

| | | | | | | | |
|---|---|---|---|---|---|---|---|
| 1 | 1 | 1 | 1 | 1 | 1 | 1 | 1 |
| -1 | 1 | -1 | 1 | -1 | 1 | -1 | 1 |
| -1 | -1 | 1 | 1 | -1 | -1 | 1 | 1 |
| 1 | -1 | -1 | 1 | 1 | -1 | -1 | 1 |
| -1 | -1 | -1 | -1 | 1 | 1 | 1 | 1 |
| 1 | -1 | 1 | -1 | -1 | 1 | -1 | 1 |
| 1 | 1 | -1 | -1 | -1 | -1 | 1 | 1 |
| -1 | 1 | 1 | -1 | 1 | -1 | -1 | 1 |
| -1 | -1 | -1 | -1 | -1 | -1 | -1 | -1 |
| 1 | -1 | 1 | -1 | 1 | -1 | 1 | -1 |
| 1 | 1 | -1 | -1 | 1 | 1 | -1 | -1 |
| -1 | 1 | 1 | -1 | -1 | 1 | 1 | -1 |
| 1 | 1 | 1 | 1 | -1 | -1 | -1 | -1 |
| -1 | 1 | -1 | 1 | 1 | -1 | 1 | -1 |
| -1 | -1 | 1 | 1 | 1 | 1 | -1 | -1 |
| 1 | -1 | -1 | 1 | -1 | 1 | 1 | -1 |

Weights

| 0.98 | 0.90 | 0.20 | 1.00 | 0.90 | 0.10 | 1.00 | 0.30 |
|---|---|---|---|---|---|---|---|
| -0.98 | 0.90 | 0.20 | -1.00 | 0.90 | -0.10 | -1.00 | 0.30 |

Inner Product (Component) — No Noise Inner Product

| -0.98 | 0.9 | 0.2 | -1 | 0.9 | -0.1 | -1 | 0.3 | -0.776 |
|---|---|---|---|---|---|---|---|---|
| 0.976 | 0.9 | -0.2 | -1 | -0.9 | -0.1 | 1 | 0.3 | 0.976 |
| 0.976 | -0.9 | 0.2 | -1 | -0.9 | 0.1 | -1 | 0.3 | -2.224 |
| -0.98 | -0.9 | -0.2 | -1 | 0.9 | 0.1 | 1 | 0.3 | -0.776 |
| 0.976 | -0.9 | -0.2 | 1 | 0.9 | -0.1 | -1 | 0.3 | 0.976 |
| -0.98 | -0.9 | 0.2 | 1 | -0.9 | -0.1 | 1 | 0.3 | -0.376 |
| -0.98 | 0.9 | -0.2 | 1 | -0.9 | 0.1 | -1 | 0.3 | -0.776 |
| 0.98 | 0.9 | 0.2 | 1 | 0.9 | 0.1 | 1 | -0.3 | 5.376 |
| 0.976 | -0.9 | -0.2 | 1 | -0.9 | 0.1 | 1 | -0.3 | 0.776 |
| -0.98 | -0.9 | 0.2 | 1 | 0.9 | 0.1 | -1 | -0.3 | -0.976 |
| -0.98 | 0.9 | -0.2 | 1 | 0.9 | -0.1 | 1 | -0.3 | 2.224 |
| 0.976 | 0.9 | 0.2 | 1 | -0.9 | -0.1 | -1 | -0.3 | 0.776 |
| -0.98 | 0.9 | 0.2 | -1 | -0.9 | 0.1 | 1 | -0.3 | -0.976 |
| 0.976 | 0.9 | -0.2 | -1 | 0.9 | -0.1 | -1 | -0.3 | 0.376 |
| 0.976 | -0.9 | 0.2 | -1 | 0.9 | 0.1 | 1 | -0.3 | 0.776 |
| -0.98 | -0.9 | -0.2 | -1 | -0.9 | -0.1 | -1 | -0.3 | -5.376 |

| -0.98 | 0.90 | 0.20 | -1.00 | 0.90 | -0.10 | -1.00 | 0.30 |
|---|---|---|---|---|---|---|---|

Inner Product (Component) — 1 Noise Bit Inner Product

| -0.98 | 0.9 | 0.2 | -1 | 0.9 | 0.1 | -1 | 0.3 | -0.576 |
|---|---|---|---|---|---|---|---|---|
| 0.976 | 0.9 | -0.2 | -1 | -0.9 | 0.1 | 1 | 0.3 | 1.176 |
| 0.976 | -0.9 | 0.2 | -1 | -0.9 | -0.1 | -1 | 0.3 | -2.424 |
| -0.98 | -0.9 | -0.2 | -1 | 0.9 | -0.1 | 1 | 0.3 | -0.976 |
| 0.976 | -0.9 | -0.2 | 1 | 0.9 | 0.1 | -1 | 0.3 | 1.176 |
| -0.98 | -0.9 | 0.2 | 1 | -0.9 | 0.1 | 1 | 0.3 | -0.176 |
| -0.98 | 0.9 | -0.2 | 1 | -0.9 | -0.1 | -1 | 0.3 | 0.976 |
| 0.98 | 0.9 | 0.2 | 1 | 0.9 | -0.1 | 1 | 0.3 | 5.176 |
| 0.976 | -0.9 | -0.2 | 1 | -0.9 | -0.1 | 1 | -0.3 | 0.576 |
| -0.98 | -0.9 | 0.2 | 1 | 0.9 | -0.1 | -1 | -0.3 | -1.176 |
| -0.98 | 0.9 | -0.2 | 1 | 0.9 | 0.1 | 1 | -0.3 | 2.424 |
| 0.976 | 0.9 | 0.2 | 1 | -0.9 | 0.1 | -1 | -0.3 | 0.976 |
| -0.98 | 0.9 | 0.2 | -1 | -0.9 | -0.1 | 1 | -0.3 | -1.176 |
| 0.976 | 0.9 | -0.2 | -1 | 0.9 | -0.1 | -1 | -0.3 | 0.176 |
| 0.976 | -0.9 | 0.2 | -1 | 0.9 | 0.1 | 1 | -0.3 | 0.976 |
| -0.98 | -0.9 | -0.2 | -1 | -0.9 | 0.1 | -1 | -0.3 | -5.156 |

FIG 32

| -0.98 | 0.90 | 0.20 | -1.00 | 0.90 | 0.10 | -1.00 | 0.30 |
|---|---|---|---|---|---|---|---|

Inner Product (Component)     2 Noise Bits Inner Product

| | | | | | | | | |
|---|---|---|---|---|---|---|---|---|
| -0.98 | 0.9 | -0.2 | -1 | 0.9 | 0.1 | -1 | 0.3 | -0.976 |
| 0.976 | 0.9 | 0.2 | -1 | -0.9 | 0.1 | 1 | 0.3 | 1.576 |
| 0.976 | -0.9 | -0.2 | -1 | -0.9 | -0.1 | -1 | 0.3 | -2.824 |
| -0.98 | -0.9 | 0.2 | -1 | 0.9 | -0.1 | 1 | 0.3 | -0.576 |
| 0.976 | -0.9 | 0.2 | 1 | 0.9 | 0.1 | -1 | 0.3 | 1.576 |
| -0.98 | -0.9 | -0.2 | 1 | -0.9 | 0.1 | 1 | 0.3 | -0.576 |
| -0.98 | 0.9 | 0.2 | 1 | -0.9 | -0.1 | -1 | 0.3 | -0.576 |
| 0.98 | 0.9 | -0.2 | 1 | 0.9 | -0.1 | 1 | -0.3 | 4.776 |
| 0.976 | -0.9 | 0.2 | 1 | -0.9 | -0.1 | 1 | -0.3 | 0.976 |
| -0.98 | -0.9 | -0.2 | 1 | 0.9 | -0.1 | -1 | -0.3 | -1.576 |
| -0.98 | 0.9 | 0.2 | 1 | 0.9 | 0.1 | 1 | -0.3 | 2.824 |
| 0.976 | 0.9 | -0.2 | 1 | -0.9 | 0.1 | -1 | -0.3 | 0.576 |
| -0.98 | 0.9 | -0.2 | -1 | -0.9 | -0.1 | 1 | -0.3 | -1.576 |
| 0.976 | 0.9 | 0.2 | -1 | 0.9 | -0.1 | -1 | -0.3 | 0.576 |
| 0.976 | -0.9 | -0.2 | -1 | 0.9 | 0.1 | 1 | -0.3 | 0.576 |
| -0.98 | -0.9 | 0.2 | -1 | -0.9 | 0.1 | -1 | -0.3 | -4776 |

| -0.98 | 0.90 | -0.20 | -1.00 | 0.90 | 0.10 | -1.00 | -0.30 |
|---|---|---|---|---|---|---|---|

Inner Product (Component)     3 Noise Bits Inner Product

| | | | | | | | | |
|---|---|---|---|---|---|---|---|---|
| -0.98 | 0.9 | -0.2 | -1 | 0.9 | 0.1 | -1 | -0.3 | -1.576 |
| 0.976 | 0.9 | 0.2 | -1 | -0.9 | 0.1 | 1 | -0.3 | 0.976 |
| 0.976 | -0.9 | -0.2 | -1 | -0.9 | -0.1 | -1 | -0.3 | -3.424 |
| -0.98 | -0.9 | 0.2 | -1 | 0.9 | -0.1 | 1 | -0.3 | -1.176 |
| 0.976 | -0.9 | 0.2 | 1 | 0.9 | 0.1 | -1 | -0.3 | 0.976 |
| -0.98 | -0.9 | -0.2 | 1 | -0.9 | 0.1 | 1 | -0.3 | -1.176 |
| -0.98 | 0.9 | 0.2 | 1 | -0.9 | -0.1 | -1 | -0.3 | -1.176 |
| 0.98 | 0.9 | -0.2 | 1 | 0.9 | -0.1 | 1 | -0.3 | 4.176 |
| 0.976 | -0.9 | 0.2 | 1 | -0.9 | -0.1 | 1 | 0.3 | 1.576 |
| -0.98 | -0.9 | -0.2 | 1 | 0.9 | -0.1 | -1 | 0.3 | -0.976 |
| -0.98 | 0.9 | 0.2 | 1 | 0.9 | 0.1 | 1 | 0.3 | 3.424 |
| 0.976 | 0.9 | -0.2 | 1 | -0.9 | 0.1 | -1 | 0.3 | 1.176 |
| -0.98 | 0.9 | -0.2 | -1 | -0.9 | -0.1 | 1 | 0.3 | -0.976 |
| 0.976 | 0.9 | 0.2 | -1 | 0.9 | -0.1 | -1 | 0.3 | 1.176 |
| 0.976 | -0.9 | -0.2 | -1 | 0.9 | 0.1 | 1 | 0.3 | 1.176 |
| -0.98 | -0.9 | 0.2 | -1 | -0.9 | 0.1 | -1 | 0.3 | -4.176 |

FIG 33

SOLID-STATE IMAGING DEVICE, METHOD FOR DRIVING SOLID-STATE IMAGING DEVICE, AND ELECTRONIC APPARATUS

RELATED PATENT APPLICATIONS

This application is based on and claims the benefit of priority from International Application No. PCT/JP2019/001423, filed on Jan. 18, 2019, which claims priority to Japanese Patent Application No. 2018-008400, filed on Jan. 22, 2018, the contents of which are hereby incorporated by reference in their entirety.

TECHNICAL FIELD

The present invention relates to a solid-state imaging device, a method for driving a solid-state imaging device, and an electronic apparatus.

BACKGROUND

Solid-state imaging devices (image sensors) including photoelectric conversion elements for detecting light and generating charges are embodied as CMOS (complementary metal oxide semiconductor) image sensors, which have been in practical use. The CMOS image sensors have been widely applied as parts of various types of electronic apparatuses such as digital cameras, video cameras, surveillance cameras, medical endoscopes, personal computers (PCs), mobile phones and other portable terminals (mobile devices).

As mentioned above, the CMOS image sensors are used to optically capture images in a wide range of application fields and thus have a large market. The demand for the CMOS image sensors is expected to keep growing in the future due to the increase in the CMOS image sensor applications including vehicle-mounted cameras.

In recent years, the Internet of Things (IoT), which allows everything of daily use to be connected to the Internet, has been attracting great attention. The IoT has made it possible to acquire data, collect the data in calculators on the cloud side through the Internet, analyze the collected data on the cloud side and return the result of the analysis to the IoT side. For example, when completely automated driving is realized, a vehicle-mounted sensor can be considered to be part of the IoT. If the acquired data is falsified, serious results such as accidents may be caused.

In this IoT age, it is increasingly crucial to improve the security of IoT sensors, which receives information. In order to improve the security of IoT sensors, it is required to first make sure that no illicit sensors are connected and to next verify that the data acquired by the sensors have not been falsified. The conventional encryption technique protects digital signals output from the microcomputer chips but does not always protect immediate signals output from the sensor chips. This is because sensors supplied as parts are required to be inexpensive and the security technology is not commonly used, which requires extra circuits.

Here, the Physically Unclonable Function (PUF) technology has been recently attracting attention as the LSI security technology. The PUF technology extracts variations among semiconductor units as physical characteristic amounts to acquire an output unique to each device. A PUF used in semiconductor devices is a circuit for extracting minute differences in performance attributable to factors such as variations among threshold values of transistors that occur during the manufacturing process and outputting the extracted different performance levels as a unique ID. The unique ID generated by the PUF can be used to authenticate the device and to prevent falsification of acquired data by appending a message authentication code (MAC) to the acquired data in order to verify its authenticity.

In the above-described context, a CMOS image sensor PUF (CIS-PUF) has been proposed that can accomplish security function by extracting pixel variations of a CMOS image sensor (CIS) and utilizing the extracted variations as unique information of the CIS without addition of extra circuits to the CIS.

For example, Non-Patent Literatures 1 and 2 disclose a CMOS image sensor PUF (CIS-PUF) that generates a PUF unique ID based on pixel variations of a CMOS image sensor in order to authenticate the sensor and prevent falsification of image data.

When generating a PUF response, such a CIS-PUF outputs a multi-bit, for example, 12-bit digital value (Vout) corresponding to pixel transistor variations and produces a 1/0 response based on which one of adjacent transistors has a larger threshold voltage value. When there is a large difference between the values Vout of the pixel transistors compared against each other to determine which is larger, the corresponding bit can be judged as stable since a change in environmental conditions such as noise, temperature and voltage does not invert the relation in terms of magnitude between the threshold voltage levels.

In the conventional art, a typical PUF is configured to, while generating a PUF response, determine a bit that is highly likely to be erroneous in a response (see Non-Patent Literatures 3 and 4).

RELEVANT REFERENCES

List of Relevant Patent Literature

[Non-Patent Literature 1] Okura, Nakura, Shirahata, Shiozaki, Kubota, Ishikawa, Takayanagi, Fujino, "A Proposal of PUF Utilizing Pixel Variations in the CMOS Image Sensor (1)—Basic Concept and Simulation Study—"2017 Symposium on Cryptography and Information Security (SCIS2017), 3C4-4, 2017.

[Non-Patent Literature 2] Nakura, Okura, Shirahata, Shiozaki, Kubota, Ishikawa, Takayanagi, Fujino, "A Proposal of PUF Utilizing Pixel Variations in the CMOS Image Sensor (2)—PUF Performance Evaluation with Measured Data—"2017 Symposium on Cryptography and Information Security (SCIS2017), 3C4-5, 2017.

[Non-Patent Literature 3] D. Lim, J. W. Lee, B. Gassend, G. E. Suh, M. van Dijk, S. Devadas, "Extracting secret keys from integrated circuits", IEEE Trans. on VLSI System, vol 13, no. 10, pp. 1200-1205, 2005.

[Non-Patent Literature 4] G. E. Suh, S. Devadas, "Physical Unclonable Functions for Device Authentication and Secret Key Generation" DAC' 07, pp. 9-14, 2007.

[Non-Patent Literature 5] Y. Dodis, R. Ostrovsky, L. Reyzin, and A. Smith, "Fuzzy Extractors: How to Generate Strong Keys from Biometrics and Other Noizy Data," LNCS 3027, pp. 523-540, 2004.

[Non-Patent Literature 6] [7] Taniguchi, Shiozaki, Murayama, Kubo and Fujino, "A Soft-Decision Fuzzy Extractor for Increasing Reliability of Physical Unclonable Function Responses," the Institute of Electronics, Information and Communication Engineers (IEICE) Technical Report, 112(382), 19-24, 2013-01-21

SUMMARY

The PUF, which protects security using variations unique to each device, can be applied to perform Challenge & Response (CR) authentication and generate encryption keys (unique keys).

The PUF response inevitably contains errors induced by noise. When the PUF is applied to the CR authentication, such errors are considered and a threshold value is set to tolerate inconsistent bits to a certain extent for the authentication. The generation of encryption keys based on the PUF, on the other hand, tolerates no bit errors. Therefore, after an initial key is generated, it is required to eliminate errors in generating (regenerating) the same key.

A fuzzy extractor has been proposed to generate keys and eliminate such errors (see, for example, Non-Patent Literature 5). The fuzzy extractor operates in such a manner that a true code is decided by eliminating errors from a redundant code. It has been proposed that the decision can be performed in hard- and soft-decision manners.

As described above, a fuzzy extractor can be used to generate a stable response, and a soft decision fuzzy extractor has been proposed that uses reliability information appended to the individual bits of a PUF in order to enhance the error correcting capability (see, for example, Non-Patent Literature 6). The soft decision fuzzy extractor of this kind generates PUF responses multiple times in advance to calculate the reliability and then appends the reliability to helper data. For this reason, such soft decision fuzzy extractor needs to measure responses multiple times in order to acquire reliability information and also needs to append the reliability to helper data, which requires additional operations to obtain reliability information for each chip. Thus, when generating an initial key, the fuzzy extractor is disadvantageously required to save increased amount of data.

An object of the present invention is to provide a solid-state imaging device, a method for driving a solid-state imaging device and an electronic apparatus that eliminates the need of measuring more than one response for each chip in advance to acquire reliability information and of appending reliability to helper data, and that are capable of preventing an increase in data to be saved in a fuzzy extractor when an initial key is generated, generating unique and highly confidential response data and resultantly certainly preventing forgery and falsification of images.

A first aspect of the present invention provides a solid-state imaging device including a pixel part having a plurality of pixels arranged in a matrix pattern, where the pixels have a photoelectric converting function, a reading part for reading a pixel signal from the pixel part, and a response data generating part including a fuzzy extractor, where the response data generating part generates response data including a unique key in association with at least one selected from the group consisting of variation information of the pixels and variation information of the reading part. When regenerating a key, the response data generating part generates the unique key using helper data acquired in generation of an initial key, variation information acquired in the regeneration of the key, and reliability information determined based on the variation information acquired in the regeneration of the key.

A second aspect of the present invention provides a method for driving a solid-state imaging device including a pixel part having a plurality of pixels arranged in a matrix pattern, where the pixels have a photoelectric converting function, and a reading part for reading a pixel signal from the pixel part. The method includes steps of acquiring at least one selected from the group consisting of variation information of the pixels and variation information of the reading part, and generating response data including a unique key in association with the variation information acquired in the acquiring step, using a fuzzy extractor. In the response data generating step, when a key is regenerated, a unique key is generated using helper data acquired in generation of an initial key, variation information acquired in the regeneration of the key, and reliability information determined based on the variation information acquired in the regeneration of the key.

A third aspect of the present invention provides an electronic apparatus including a solid-state imaging device, and an optical system for forming a subject image on the solid-state imaging device. The solid-state imaging device includes a pixel part having a plurality of pixels arranged in a matrix pattern, where the pixels have a photoelectric converting function, a reading part for reading a pixel signal from the pixel part, and a response data generating part including a fuzzy extractor, where the response data generating part generates response data including a unique key in association with at least one selected from the group consisting of variation information of the pixels and variation information of the reading part. The response data generating part generates, when regenerating a key, a unique key using helper data acquired in generation of an initial key, variation information acquired in the regeneration of the key, and reliability information determined based on the variation information acquired in the regeneration of the key.

Advantageous Effects

The present invention can eliminate the need of measuring more than one response for each chip in advance to acquire reliability information and of appending reliability to helper data and prevent an increase in data to be saved in a fuzzy extractor when an initial key is generated, generate unique and highly confidential response data and resultantly certainly prevent forgery and falsification of images.

BRIEF DESCRIPTION OF THE DRAWINGS

FIGS. 7A and 7B are used to explain the reasons why leakage current is employed as pixel variation information.

FIGS. 8A and 8B show, as an example, the amount of information per pixel.

FIGS. 9A and 9B are used to describe the outputs and amount of information provided when there are nine elements.

FIGS. 11A to 11D show operational waveforms in main parts in a normal operational mode and a response generation mode when the leakage current of photodiodes is employed as the leakage current of pixels.

FIGS. 13A to 13E show operational waveforms in main parts in a normal operational mode and a response generation mode when variations in threshold value among source follower transistors are employed as pixel variation information.

FIGS. 18A and 18B show stable and unstable bits of the PUF response.

FIGS. 21A and 21B are first views used to illustrate a second reliability setting method relating to an embodiment of the present invention.

FIG. 25 is used to illustrate correlation decoding that uses reliability to perform decision.

FIG. 30 shows RM codes that are assigned to all of the four bits.

FIG. 31 shows humming distance (HD) between the code of a regenerated response containing noise and the other codes.

FIG. 32 shows a small weight is assigned to a bit that is likely to be inverted, and a large weight is given to a bit that is unlikely to be inverted.

FIG. 33 shows that the negative contribution is small relative to the positive contribution made by the not-inverted bits.

LIST OF REFERENCE NUMBERS 10, 10A . . . solid-state imaging device, 20, 20A . . . pixel part, 30 . . . vertical scanning circuit, 40 . . . reading circuit, 44 . . . clip circuit, 50 . . . horizontal scanning circuit, 60 . . . timing control circuit, 70 . . . signal processing circuit, 80 . . . encryption processing system, 81 . . . information acquiring part, 82, 82A . . . key generating part, 820 . . . fuzzy extractor, 821 . . . initial key generating part, 822 . . . key regenerating part, 83 . . . image data generating part, 84 . . . identification data generating part, 85 . . . integrating part, 86 . . . memory, 90 . . . reading part, 100 . . . CR authentication system, 200 . . . CIS-PUF chip, 300 . . . microcomputer, 400 . . . electronic apparatus, 410 . . . CMOS image sensor (IMGSNS), 420 . . . optical system, 430 . . . signal processing circuit (PRC)

DESCRIPTION OF THE PREFERRED EMBODIMENTS

Embodiments of the present invention will be hereinafter described with reference to the drawings.

Figure 1:
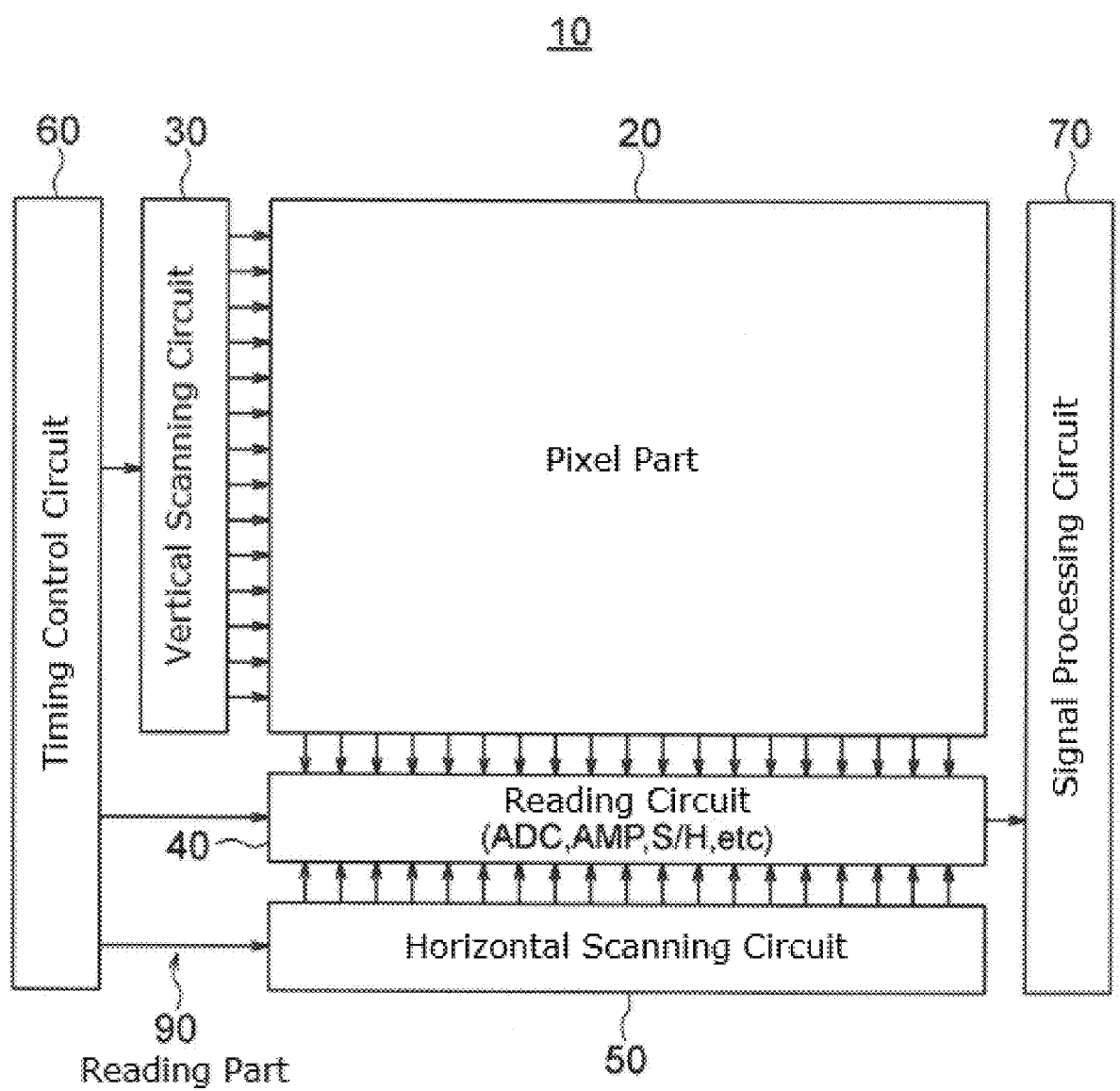
FIG. 1 is a block diagram showing an example configuration of a solid-state imaging device relating to an embodiment of the present invention.

FIG. 1 is a block diagram showing an example configuration of a solid-state imaging device relating to an embodiment of the present invention. In this embodiment, a solid-state imaging device 10 is constituted by, for example, a CMOS image sensor.

As shown in FIG. 1, the solid-state imaging device 10 is constituted mainly by a pixel part 20 serving as an image capturing part, a vertical scanning circuit (a row scanning circuit) 30, a reading circuit (a column reading circuit) 40, a horizontal scanning circuit (a column scanning circuit) 50, a timing control circuit 60, and a signal processing circuit 70. Among these components, for example, the vertical scanning circuit 30, the reading circuit 40, the horizontal scanning circuit 50, and the timing control circuit 60 constitute the reading part 90 for reading out pixel signals.

The solid-state imaging device 10 relating to the embodiment is configured as a CMOS image sensor PUF (CIS-PUF) that generates a PUF unique ID based on pixel variations of the CMOS image sensor in order to authenticate the sensor and prevent falsification of image data. The solid-state imaging device 10 or CIS-PUF is configured to, when generating a PUF response, generate response data including a unique key in association with at least one selected from the group consisting of pixel variation information and reading-part variation information.

As will be described in detail below, when generating variation information of the pixels or reading part 90, which serves as a PUF response, the solid-state imaging device 10 relating to the present embodiment outputs a multi-bit, for example, 12-bit digital value (Vout) corresponding to, for example, variations among pixel transistors and acquire I/O response data based on which one of the threshold voltage values of adjacent transistors is larger. In the solid-state imaging device 10, when there is a large difference between the digital values Vout of the pixel transistors to be compared with each other, changes in environmental conditions such as noise, temperature and voltage do not result in inverting the relation between the digital values Vout and the threshold voltage VTH. Thus, the corresponding bits can be determined stable.

In the solid-state imaging device 10 relating to the present embodiment, a response data generating part uses a fuzzy extractor and generates a stable response by making an effective use of a multi-bit or, for example, 12-bit digital value Vout corresponding to pixel transistor variations. As will be described in detail below, the solid-state imaging device 10 acquires reliability information of the bits of the PUF response in relation to the digital values Vout acquired by the CIS-PUF and uses the acquired reliability information in the soft decision fuzzy extractor (key regenerating part). In other words, in the present embodiment, the CIS-PUF can determine reliability information based on a PUF response (variation information) generated when a key is regenerated. Accordingly, the initial key generation is performed in the same manner as hard decision, and the key regeneration involves appending reliability based on the acquired data to perform soft decision.

In this way, the solid-state imaging device 10 relating to the present embodiment does not need to measure a plurality of responses for each chip in advance for the purposes of acquiring reliability information or to append reliability to helper data. This can prevent an increased amount of data from being saved in the fuzzy extractor when the initial key is generated and contribute to generate highly secretive and unique response data. Accordingly, the present embodiment can reliably prevent falsification or forgery of images.

In the present embodiment, the CMOS image sensor PUF (CIS-PUF) extracts at least one selected from the group consisting of pixel variation information and reading-part variation information of the CMOS image sensor and uses the extracted information to a PUF. A CDS circuit is designed to largely eliminate the pixel variations. The CIS-PUF is configured to operate in a normal imaging mode (normal operational mode), in which image capturing is performed with a Correlated Double Sampling (CDS) circuit in operation, and a PUF mode (response generation mode), in which image capturing is performed without placing a CDS circuit in operation.

The CIS-PUF is a PUF that uses the address of a pixel as a challenge and the I/O data generated in a predetermined procedure as a response. The following briefly describes Challenge & Response authentication (CR authentication) using a PUF, which protects security based on variations unique to each device.

Figure 2:
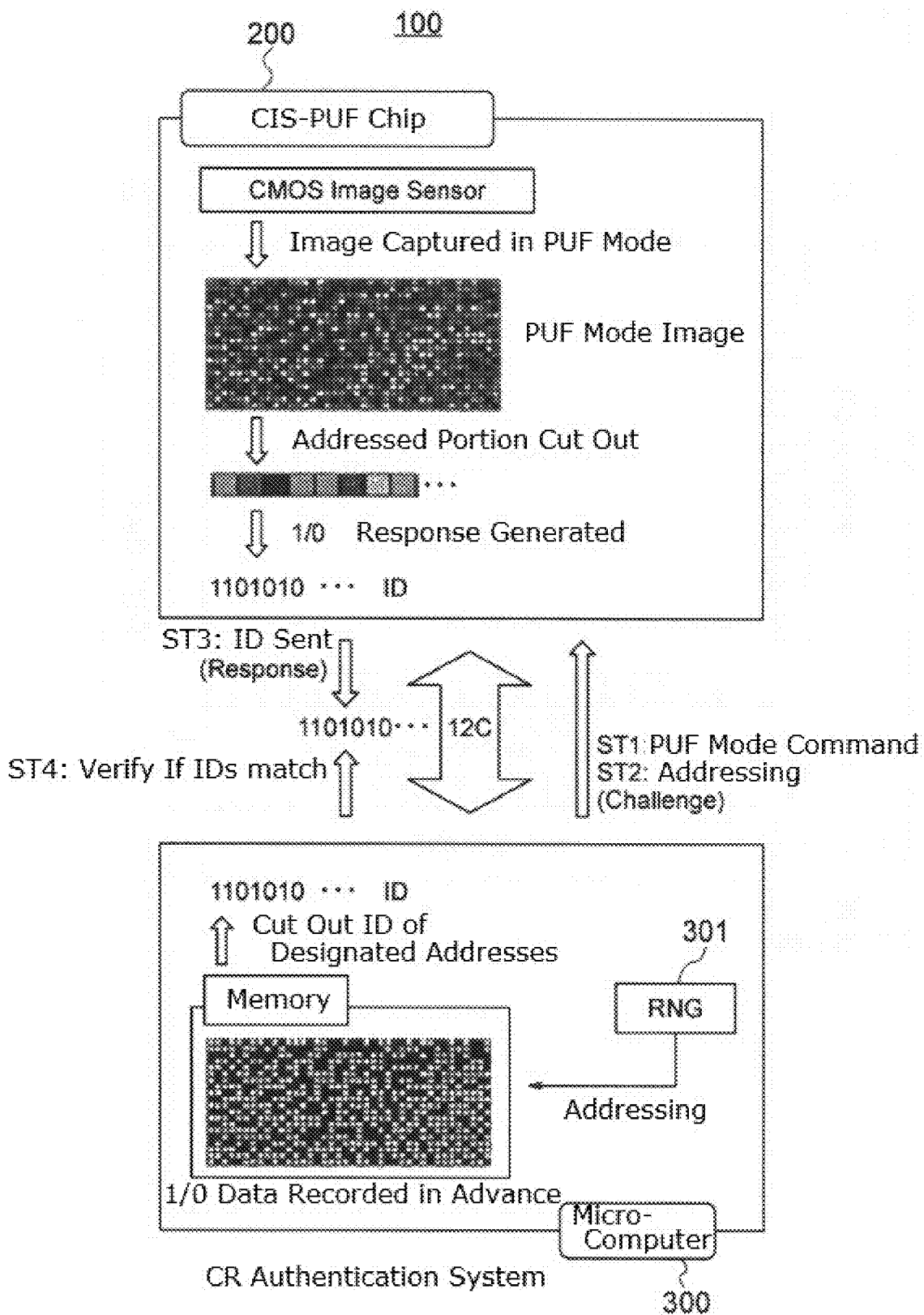
FIG. 2 is used to briefly illustrate a Challenge & Response (CR) authentication system.

FIG. 2 is used to briefly illustrate a Challenge & Response (CR) authentication system.

A CR authentication system 100 shown in FIG. 2 includes a CIS-PUF chip 200 having the solid-state imaging device 10 relating to the embodiment mounted therein and a microcomputer 300.

In the CR authentication system 100 using the CIS-PUF, the microcomputer 300, which is the authenticator side, sends a PUF mode command to the CIS-PUF chip 200 (step ST1). In response to this, the CIS-PUF chip 200 captures an image in a PUF mode and thus acquires a PUF mode image. Following this, the microcomputer 300 uses a random number generator (RNG) 301 in order to provide a random number to determine which pixels are used to generate an ID and sends the designated addresses of the pixels as challenge information to the CIS-PUF chip 200 (step ST2). In accordance with the received designated addresses, the CIS-PUF chip 200 cuts out a PUF mode image and generates I/O data. As a response to the challenge, the CIS-PUF chip 200 sends this ID to the microcomputer 300 (step ST3). The microcomputer 300 extracts the ID of the designated addresses from the I/O data registered in advance and compares the extracted ID with the ID received from the CIS-PUF chip 200. If the IDs match, the authentication is successful (step ST4).

The following outlines the configurations and functions of the parts of the solid-state imaging device 10, in particular, the configuration and function of the pixel part 20. The following then describes the characteristic configurations and functions of the solid-state imaging device 10 relating to the present embodiment, with a focus on unique key generation and response data generation for integrating identification data including the unique key with image data to generate response data, which is also referred to as encryption. More specifically, in order to generate a stable response, the response data generating part uses a fuzzy extractor. In order to generate a stable response, the response data generating part makes an effective use of 12-bit digital values Vout corresponding to pixel transistor variations to acquire reliability information of the bits of the PUF response, and uses the acquired reliability information in a soft decision fuzzy extractor (key regenerating part). The specific series of operations will be described in detail below. The following also shows the results of using actual data to examine the correcting capability achieved by the soft decision made by the fuzzy extractor.

<Basic Configuration of Pixel and Pixel Part 20>

In the pixel part 20, a plurality of pixels each including a photodiode (photoelectric converting element) and an in-pixel amplifier are arranged in a two-dimensional matrix comprised of n rows and m columns.

Figure 3:
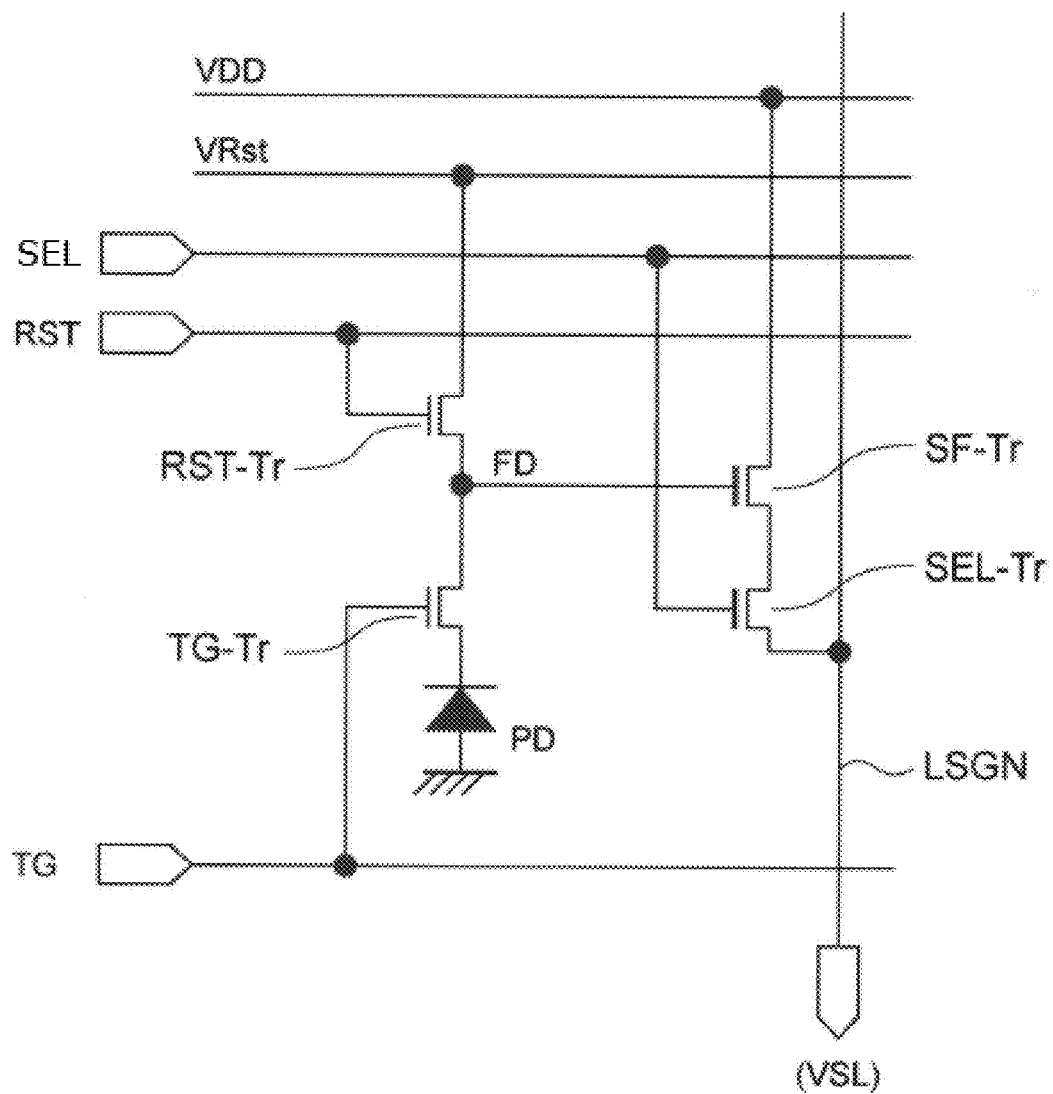
FIG. 3 is a circuit diagram showing an example of a pixel relating to the embodiment.

FIG. 3 is a circuit diagram showing an example of a pixel according to the embodiment.

The pixel PXL includes, for example, a photodiode (PD) serving as a photoelectric converting element. For the photodiode PD, one transfer transistor TG-Tr, one reset transistor RST-Tr, one source follower transistor SF-Tr and one selection transistor SEL-Tr are provided.

The photodiode PD generates signal charges (electrons) in an amount in accordance with the quantity of the incident light and stores the generated signal charges. A description will be hereinafter given of a case where the signal charges are electrons and each transistor is an n-type transistor. However, it is also possible that the signal charges are holes or each transistor is a p-type transistor. Further, this embodiment is also applicable to the case where a plurality of photodiodes share the transistors, namely, the reset transistor RST-Tr, source follower transistor SF-Tr and selection transistor SEL-Tr, and to the case where the pixel includes three transistors (3Tr) and excludes the selection transistor, as will be illustrated below.

The transfer transistor TG-Tr is connected between the photodiode (PD) and a floating diffusion (FD) and controlled through a control signal TG. The transfer transistor TG-Tr remains selected and in the conduction state during a period in which the control signal TG is at the high (H) level, to transfer to the floating diffusion FD the electrons produced by photoelectric conversion in the photodiode PD.

The reset transistor RST-Tr is connected between a power supply line VRst and the floating diffusion FD and controlled through a control signal RST. The reset transistor RST-Tr may be alternatively connected between the power supply line VDD and the floating diffusion FD and controlled through the control signal RST. The reset transistor RST-Tr remains selected and in the conduction state during a period in which the control signal RST is at the H level, to reset the floating diffusion FD to the potential of the power supply line VRst (or VDD).

The source follower transistor SF-Tr and the selection transistor SEL-Tr are connected in series between the power supply line VDD and the vertical signal line LSGN. The gate of the source follower transistor SF-Tr is connected to the floating diffusion FD, and the selection transistor SEL-Tr is controlled through a control signal SEL. The selection transistor SEL-Tr remains selected and in the conduction state during a period in which the control signal SEL is at the H level. In this way, the source follower transistor SF-Tr outputs, to the vertical signal line LSGN, a column output analog signal VSL corresponding to the potential at the floating diffusion FD. These operations are performed simultaneously and in parallel for pixels in each row since, for example, the gates of the transfer transistors TG-Tr, the reset transistors RST-Tr, and the selection transistors SEL-Tr in each row are connected to each other.

Since the pixel part 20 includes the pixels PXL arranged in n rows and m columns, there are n control lines for each of the control signals SEL, RST and TG, and m vertical signal lines LSGN. In FIG. 3, the control line of each control signal SEL, RST, TG is represented as one row-scanning control line.

The vertical scanning circuit 30 drives the pixels in shutter and read-out rows through the row-scanning control lines under the control of the timing control circuit 60. Further, the vertical scanning circuit 30 outputs, according to address signals, row selection signals for row addresses of the read-out rows from which signals are to be read out and the shutter rows in which the charges accumulated in the photodiodes PD are reset.

The reading circuit 40 includes a plurality of column signal processing circuits (not shown) arranged corresponding to the column outputs of the pixel part 20, and the reading circuit 40 may be configured such that the plurality of column signal processing circuits can perform column parallel processing.

The reading circuit 40 may include a correlated double sampling (CDS) circuit, an analog-to-digital converter (ADC), an amplifier (AMP), a sample/hold (S/H) circuit, and the like.

Figure 4A:
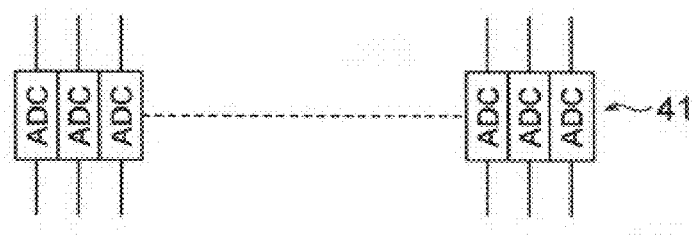
FIGS. 4A to 4C illustrate example configurations of a reading system for column outputs from a pixel part of the solid-state imaging device according to the embodiment of the present invention.
Figure 4B:
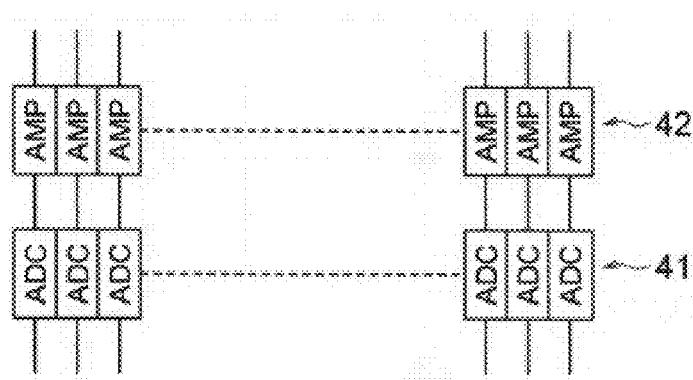
Figure 4C:
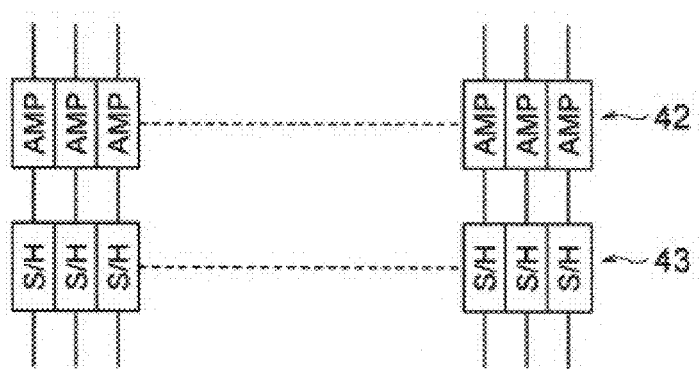

As mentioned above, as shown in FIG. 4A, for example, the reading circuit 40 may include ADCs 41 for converting the column output analog signals VSL from the pixel part 20 into digital signals. Alternatively, as shown in FIG. 4B, for example, the reading circuit 40 may include amplifiers (AMPs) 42 for amplifying the column output analog signals VSL from the pixel part 20. It is also possible that, as shown in FIG. 4C, for example, the reading circuit 40 may include sample/hold (S/H) circuits 43 for sampling/holding the column output analog signals VSL from the pixel part 20. The reading circuit 40 may have an SRAM arranged therein, which serves as a column memory for saving therein a signal acquired by performing a predetermined processing on the pixel signal output from each column of the pixel part 20.

The horizontal scanning circuit 50 scans the signals processed in the plurality of column signal processing circuits of the reading circuit 40 such as ADCs, transfers the signals in a horizontal direction, and outputs the signals to the signal processing circuit 70.

The timing control circuit 60 generates timing signals required for signal processing in the pixel part 20, the vertical scanning circuit 30, the reading circuit 40, the horizontal scanning circuit 50, and the like.

The signal processing circuit 70 performs predetermined signal processing on the read-out signals that have been read by the reading circuit 40 and subjected to predetermined processing to generate two-dimensional image data, in a normal reading mode (MDU).

As described above, the solid-state imaging device 10 (CMOS image sensor) generates electrons from a slight amount of light through photoelectric conversion, converts the electrons into voltage with a minute capacitor, and outputs the voltage using the source follower transistor SF-Tr having a minute area. Therefore, minute noise such as the noise generated when the capacitor is reset and variations among the individual transistors need to be eliminated. To do so, the difference between the reset level (VRST) and the luminance level (signal level: VSIG) is output for each pixel. As mentioned above, the CMOS image sensor outputs the difference between the reset level and the luminance level for each pixel in order to eliminate the reset noise and the variation among the threshold values. In this way, the CMOS image sensor can detect a signal of several electrons. The detection of the difference is referred to as the correlated double sampling (CDS), which is the widely used technology. The CDS reading is sequentially performed on all of the pixels arranged in an array manner, so that normal two-dimensional image data corresponding to one frame is output.

The solid-state imaging device 10 relating to the present embodiment is configured to perform the series of operations to generate the normal two-dimensional image data when in the normal operational mode (MDU).

The signal processing circuit 70 relating to the present embodiment is configured to, in order to prevent unauthorized usage, falsification and forgery of images, generate a unique key based on variation information (pixel or reading-circuit variations) unique to the solid-state imaging device 10, combine the unique key with the data acquired by the solid-state imaging device 10 to generate identification data, and integrate the identification data with the image data to output the result as response data RPD. In this way, the identification data cannot be correctly generated when the information relating to the unique key is absent.

The solid-state imaging device 10 relating to the present embodiment is configured to perform the series of operations to generate the unique key in the response generation mode MDR (PUF mode).

In the response generation mode MDR relating to the present embodiment, the solid-state imaging device 10 outputs, as a unique ID, pixel variation pattern (variation information) unique to each chip, which is independent from the surrounding luminance. In other words, in the response generation mode MDR relating to the present embodiment, the solid-state imaging device 10 outputs only the pixel-wise variation pattern. Since the luminance level is not output, the output pattern image can be independent from the conditions under which the image sensor is exposed to light. The output from each pixel contains FPN and thermal noise that randomly varies among individual frames, but the FPN is 10 times or more as large as the thermal noise in the response generation mode MDR. Accordingly, the solid-state imaging device 10 can output as the response data RPD a stable fixed variation pattern.

In the response generation mode MDR relating to the present embodiment, when generating a unique key, the solid-state imaging device 10 generates response data including a unique key in association with at least one selected from the group consisting of pixel variation information and reading-part variation information.

The above has outlined the configurations and functions of the parts of the solid-state imaging device 10, in particular, the basic configuration and function of the pixel part 20. The following describes the characteristic configurations and functions of the solid-state imaging device 10 relating to the present embodiment, with a focus on unique key generation and response data generation for integrating identification data including the unique key with image data to generate response data, which is also referred to as encryption.

Figure 5:
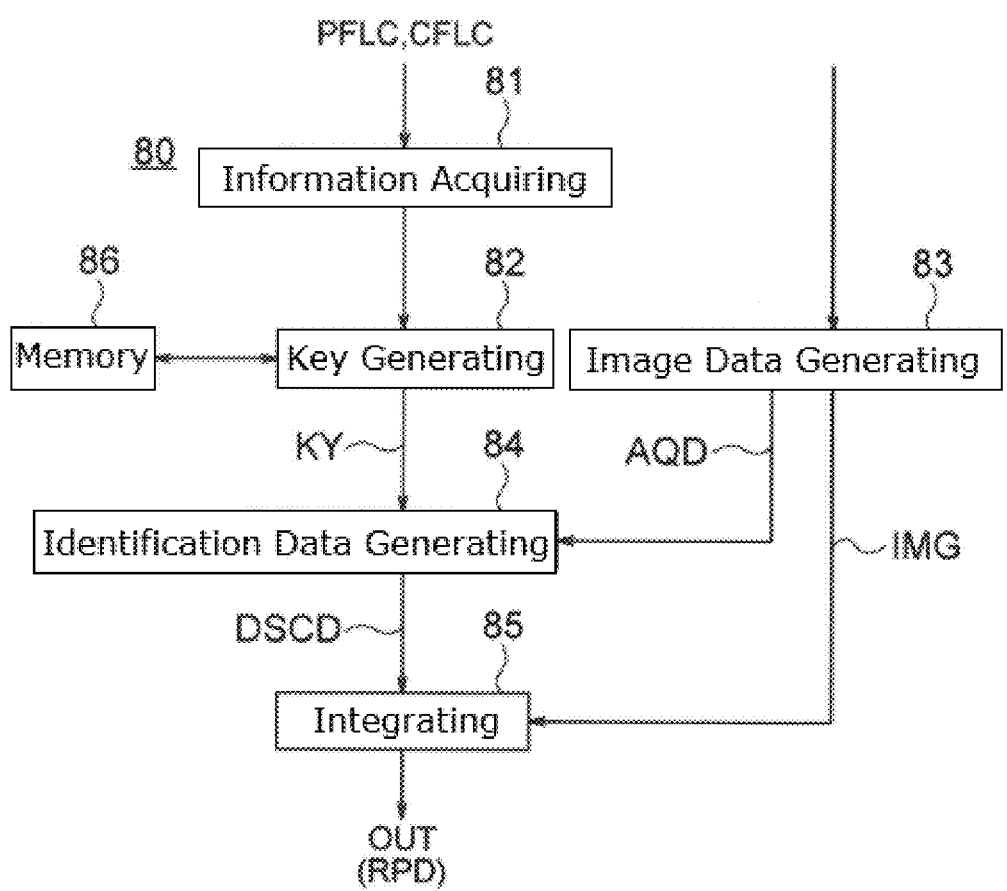
FIG. 5 is a block diagram generally and briefly showing a response generating part, which is an encryption processing system relating to the embodiment of the present invention.
Figure 6:
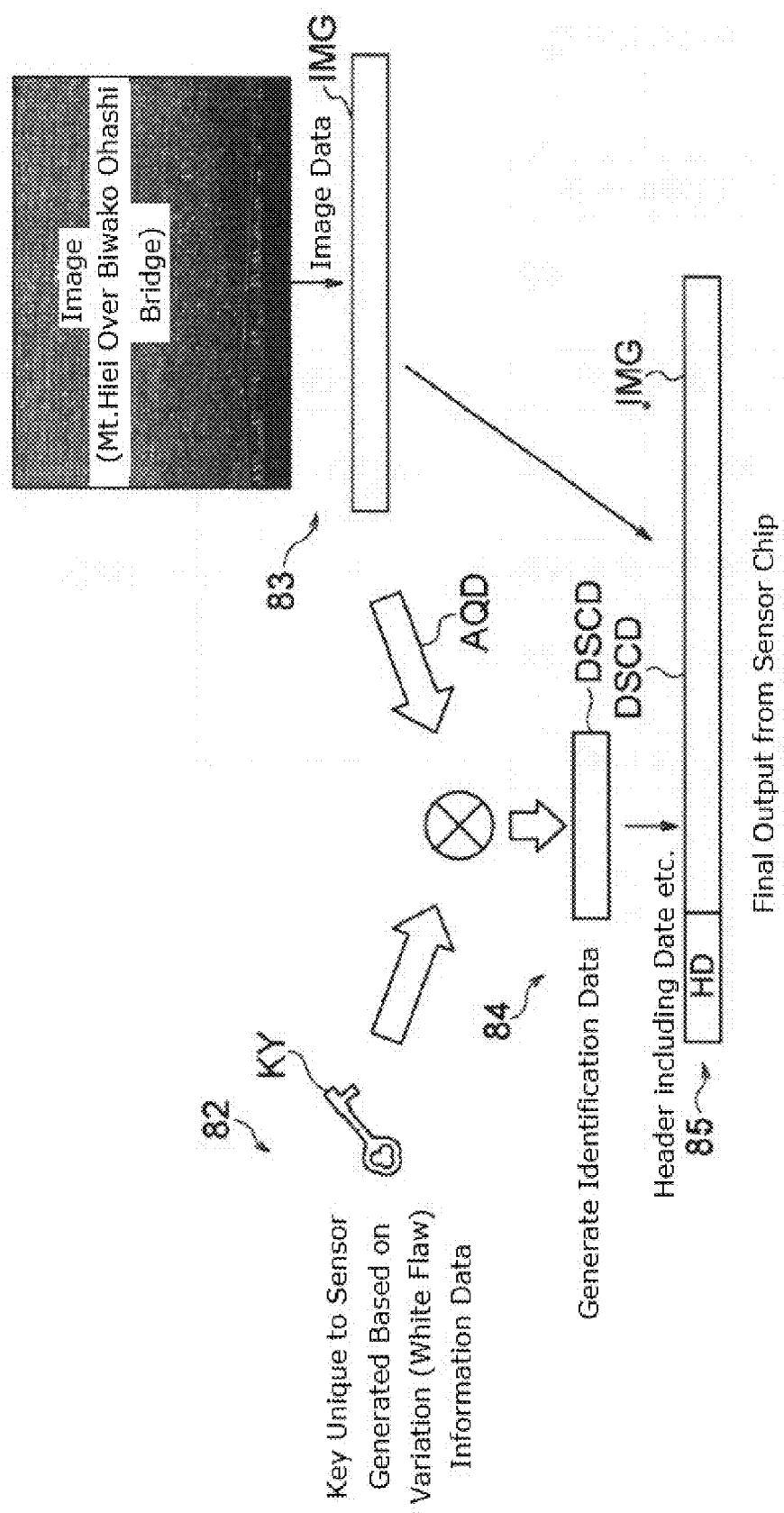
FIG. 6 schematically shows how the response data generating part, or the encryption processing system shown in FIG. 5, operates.

FIG. 5 is a block diagram generally and briefly showing the response data generating part, which is an encryption processing system relating to the embodiment of the present invention. FIG. 6 schematically shows how the response data generating part, or the encryption processing system shown in FIG. 5, operates.

A response data generating part 80 or the encryption processing system shown in FIG. 5 is mainly constituted by an information acquiring part 81, a key generating part 82, an image data generating part 83, an identification data generating part 84, an integrating part 85, and a memory 86. In the example shown in FIG. 5, the information acquiring part 81 and the key generating part 82 are shown as separate functional blocks, but they may be configured as a single functional block.

The information acquiring part 81 acquires at least one selected from the group consisting of variation information PFLC of the pixels PXL and variation information CFLC of the component circuits of the reading circuit 40 and feeds the acquired variation information to the key generating part 82.

The following now briefly describes the variation information PFLC of the pixels PXL, as an example.

<Variation Information PFLC of Pixels PXL>

The following now describes the variation information PFLC of the pixels PXL. In the present embodiment, the variation information PFLC of the pixels PXL is basically based on leakage current and position information. The following explains the reason why the leakage current is employed.

FIGS. 7A and 7B are used to explain the reason why the leakage current is employed to generate the variation information of the pixels. FIG. 7A shows an example intensity distribution of the pixel leakage current, and FIG. 7B shows an example distribution of the positions of white flaws.

The sensor pixels of the solid-state imaging device 10 have leakage current, which can not be completely controlled, as shown in FIG. 7A. The pixels with extremely large leakage current (which may instantly cause blown out highlights even under dark field exposure) may be referred to as white flaws or spots. In the following, such pixels are referred to as white flaws. Although efforts are made to reduce the white flaws as hard as possible before the solid-state imaging device 10 is shipped, the still remaining white flaw pixels are compensated for by subsequent image processing based on the surrounding pixel data, and a resulting image is output. The white flaws can be located in the array of pixels only after the solid-state imaging device 10 is manufactured and are reproducible. Therefore, the white flaws can be considered to be unique information to individual solid-state imaging devices. For the above reasons, in the present embodiment, the leakage current and position information are used as the variation information PFLC of the pixels PXL in order to generate a unique key KY. For example, as shown in FIG. 7B, the unique key KY can be generated using as the unique information the location and number of the generated white flaws. In the present embodiment, encryption is performed such that the above information is treated as the unique key and the PUF techniques, which are used in the field of security, are applied.

FIGS. 8A and 8B show, as an example, the amount of information per pixel. The amount of information H per pixel is given by the following expression.

$$H = -P0 \cdot \log_2(P0) - P1 \cdot \log_2(P1)$$

Here, P0 denotes the probability of the occurrence of a white flaw and P1 denotes the probability of the non-occurrence of a white flaw and is equal to 1−P0.

For example, when there are one million (1E6) pixels, white flaws of 100 ppm means 100 white flaws and the amount of information can be represented as follows.

$$1.47E{-}3 \times 1E6 = 1.47E3 \text{ bit} = 1{,}470 \text{ bit}$$

To generate a key, the following probability of the occurrence of a white flaw is required per pixel (from the perspective of security).

100 to 3,000 ppm=0.01% to 0.3%

Figure 10:
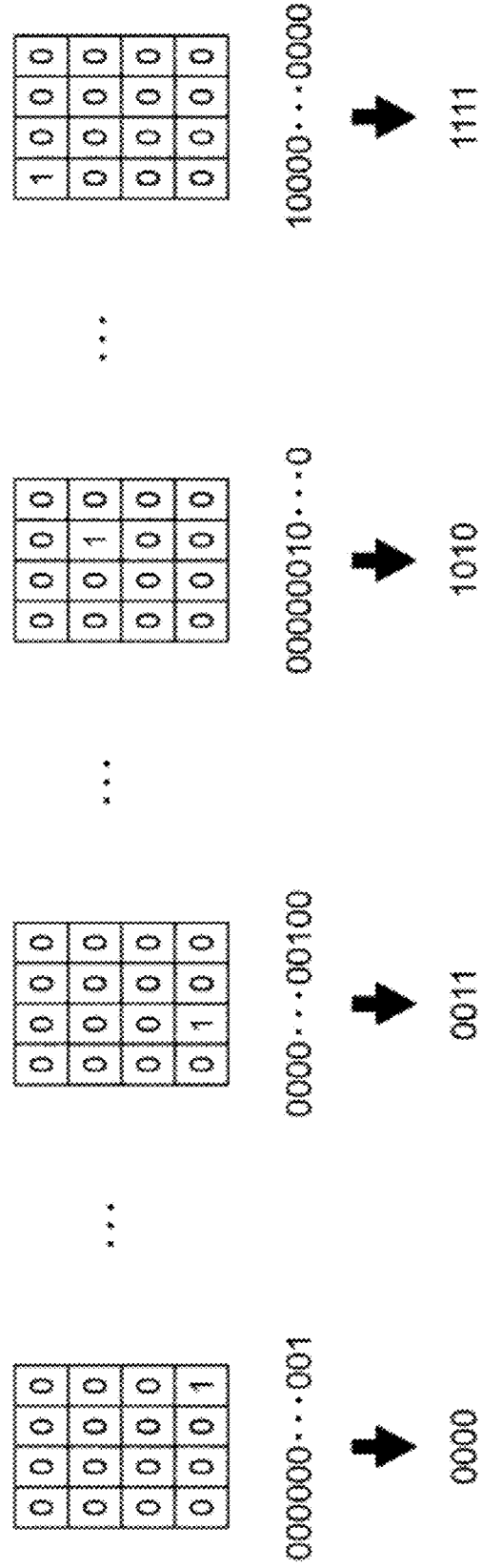
FIG. 10 is used to describe the non-uniform outputs and amount of information provided when there are sixteen elements.

The following studies the outputs and amount of information in connection with FIGS. 9A and 9B and 10. FIGS. 9A and 9B are used to describe the outputs and amount of information provided when there are nine elements. FIG. 10 is used to describe the non-uniform outputs and amount of information provided when there are sixteen elements.

In the case of nine (3×3) elements, if 1 or 0 is output by each element with the probability of 1/2 as shown in FIG. 9A, the outputs can be directly used as a key. As a result, the outputs are effectively used as a 9-bit key information. If noise requires 5 bits to correct errors, only 4 bits accounts for the effective key information, as shown in FIG. 9B. As a result, 4-bit information is output as a key.

The following describes a case where there are 16 (4×4) elements and the outputs are non-uniform. In the case of 16 (4×4) elements, as shown in FIG. 10, if 1 is output by each element with the probability of 1/16 in a sample group of elements where 1 is always output by one of the elements, the total number of combinations is only 16, which means only 4-bit information. The amount of information provided by white flaws can be calculated in the same manner as described above. If 1 or 0 is output by each of the one million pixels with the probability of 1/2, the amount of information is one million bits. If white flaws appear with 100 ppm in the one million pixels, however, the amount of information provided by such white flaws is approximately 1,400 bits. Having such an amount of information, the white flaws can be effectively used as a key.

The information acquiring part 81, which is configured to acquire the variation information PFLC of the pixels, acquires the leakage current information of the pixels is acquired in association with the threshold value VTH, as shown in FIG. 7A. In the example case of FIG. 7A, when the leakage current Ileak is larger than the threshold value VTH1, the pixel can be judged as causing a white flaw. A plurality of threshold values may be set for the information acquiring part 81 (VTH1 and VTH2 in the example case of FIG. 7A). The information can be differentiated based on the threshold values VTH1 and VTH2. The threshold value VTH can depend on the environment such as the temperature.

The information acquiring part 81 can employ the positions of the pixels that exhibit leakage current exceeding a certain level, as the variation information PFLC of the pixels. The information acquiring part 81 can employ a set of some top pixels in the descending order in terms of leakage current, as the variation information PFLC of the pixels. The information acquiring part 81 can employ column and row addresses of the set of pixels, as the variation information PFLC of the pixels.

<Leakage Current of Photodiode>

The information acquiring part 81 can, for example, employ the leakage current of the photodiode PD as the leakage current Ileak of the pixel.

Figure 11C:
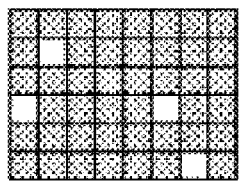
Figure 11D:
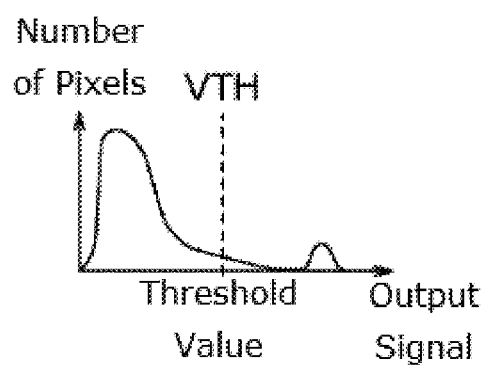

FIGS. 11A to 11D show operational waveforms in the main parts in the normal operational mode and the response generation mode MDR when the leakage current of the photodiode PD is employed as the leakage current Ileak of the pixel. FIG. 11A shows the operational waveforms in the normal operational mode MDU, FIG. 11B shows the operational waveforms in the response generation mode MDR, FIG. 11C shows the concept of a key pattern obtained by binarizing the variation information, and FIG. 11D shows how the output signal is related to the number of pixels and the threshold value VTH. As described above, the solid-state imaging device 10 relating to the present embodiment is configured to operate in the normal operational mode MDU and the response generation mode MDR.

In the normal operational mode MDU, as shown in FIG. 11A, the pixel PXL is reset while the shutter is closed and exposed to light while the shutter is opened. The signal is read out while the shutter is closed.

In the response generation mode MDR, as shown in FIG. 11B, the pixel is reset while the shutter is closed, and the pixel signal is read out after a certain period of time has elapsed. In this case, the pixel is not exposed to light. Accordingly, the output pixel signal only reflects the leakage current in the photodiodes PD and is used a unique key pattern. This unique key pattern has a local maximal value attributable to heavy metal contamination or the like as shown in FIG. 11D and is thus highly reproducible.

Figures 12A, 12B:
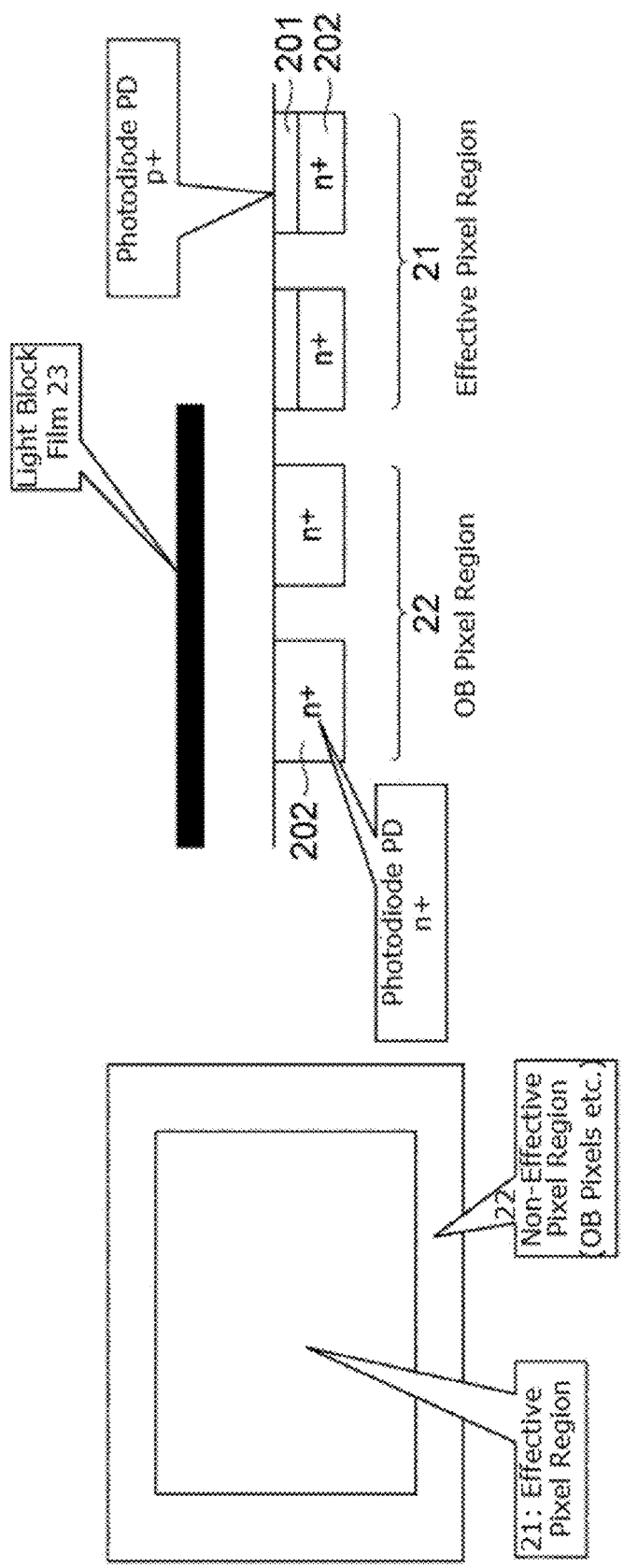
FIGS. 12A and 12B are used to illustrate a case where the information provided by the non-effective pixel region, which excludes the effective pixels from the pixel part, is employed as pixel variation information.

The information acquiring part 81 can employ, as the variation information PFLC of the pixels, the information provided by the photodiodes in the non-effective pixel region, which excludes the effective pixels from the pixel part 20. FIGS. 12A and 12B are used to illustrate that the information provided by the non-effective pixel region, which excludes the effective pixels of the pixel part 20, is employed as the variation information PFLC of the pixels.

As shown in FIG. 12A, the pixel part 20 typically includes an effective pixel region 21 and a non-effective pixel region (an optical black (OB) region and the like) 22 surrounding the effective pixel region 21. The non-effective pixel region (OB: optical black region) 22 is blocked from light by a light block film 23, as shown in FIG. 12B. In the present embodiment, information provided by white flaws or dark current in the pixel region excluding the effective pixels, for example, the pixels in the OB pixel region 22 is employed to generate a key, so that the key can not be easily detected (a dedicated read-out timing is required to detect the key).

A buried photodiode (BPD) is widely used as a photodiode (PD). On a substrate surface for forming the photodiodes (PDs), there is a surface level due to dangling bonds or other defects, and therefore, a lot of charges (dark current) are generated due to heat energy, so that signals fail to be read out correctly. In a buried photodiode (BPD), a charge accumulation part of the photodiode PD is buried in the substrate to reduce mixing of the dark current into signals. In the effective pixel region 21, the buried photodiode (BPD) includes a p+ layer 201 of a first conductivity type and an n+ layer 202 of a second conductivity type, which are arranged in the stated order from the front surface side. According to the present embodiment, in the OB region 22, the p shield of the p+ layer forming the surface of the photodiode PD may be removed so that dark current or white flaw (i.e., key) can be easily generated, as shown in FIG. 12B.

The leakage current of the photodiode PD may vary. In the present embodiment, such variation may be taken into consideration and added to the information used to generate a key. The number of defects used as a key, such as white flaws, may be studied. White flaws, for example, include emerging white flaws (some white flaws are added later) and disappearing white flaws. To address the emerging white flaws, a certain number of white flaws are designated as a key by designating coordinates in the chip. To address the disappearing white flaws, a larger number of white flaws than the minimum necessary number of white flaws are designated as a key. To address the emerging white flaws, white flaws within a specific output range are used as a key.

In the present embodiment, for example, the information acquiring part 81 can designate any pixel region from which the variation information PFLC of the pixels is acquired. The information acquiring part 81 can also designate a variety of regions in a dynamic manner.

<Threshold Value of Source Follower Transistor SF>

The information acquiring part 81 can employ variation information of the threshold value VTH of the source follower transistor SF, as the variation information of the pixels.

Figure 13D:
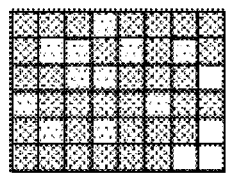
Figure 13E:
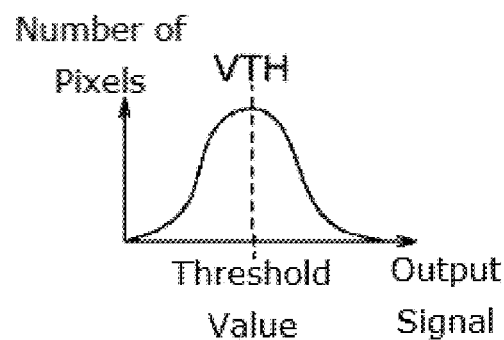

FIGS. 13A to 13E show operational waveforms in the main parts in the normal operational mode and the response generation mode when the variation information of the threshold value VTH of the source follower transistor SF is employed as the variation information of the pixels. FIG. 13A shows the circuit diagram of the reading system of the pixel PXL, FIG. 13B shows the operational waveforms in the normal operational mode MDU, FIG. 13C shows the operational waveforms in the response generation mode MDR, FIG. 13D shows the concept of a key pattern obtained by binarizing the variation information, and FIG. 13E shows how the output signal is related to the number of pixels and the threshold value VTH. In the reading system of the pixel PXL shown in FIG. 13A, the vertical signal line LSGN is connected to the CDS circuit 44 via one of the terminals of the switch SW0. The other terminal of the switch SW0 is connected to the feeding line of the reference voltage Vref.

In the normal operational mode MDU, as shown in FIG. 13B, the differential signal is used as the output signal from the pixel. This can eliminate the variations in the threshold value of the source follower transistor SF among the individual pixels PXL.

In the response generation mode MDR, as shown in FIG. 13C, the reference voltage level (Vref) is retrieved by the circuit of the subsequent stage at a timing t1, and the reset voltage level of the pixel is retrieved by the circuit of the subsequent stage at a timing t2. By reading the difference between these signals, the deviation of the reset voltage of each pixel PXL can be extracted. In the present example, the distribution of these deviations is used as a key. The deviation takes a value of approximately 100 mV and may be thus amplified using an amplifier or the like.

Here, the solid-state imaging device 10 relating to the present embodiment uses, in the key generating part 82 of the response data generating part 80 serving as an encryption processing system, a fuzzy extractor and generates stable response data by making an effective use of a multi-bit or, for example, 12-bit digital value Vout corresponding to variations among pixel transistors. The solid-state imaging device 10 acquires reliability information Q of the bits of the PUF response in relation to the digital values Vout acquired by the CIS-PUF and uses the acquired reliability information Q in the soft decision fuzzy extractor (key regenerating part). In other words, in the present embodiment, the CIS-PUF can determine reliability information based on a PUF response (variation information) generated when a key is regenerated. Accordingly, the initial key generation is performed in the same manner as hard decision, and the key regeneration involves appending reliability based on the acquired data to perform soft decision.

In the present embodiment, when a key is regenerated, the response data generating part 80 generates a unique key using the helper data acquired in initial key generation, the variation information acquired during the regeneration of the key, and reliability information Q determined based on the variation information during the regeneration of the key. In the present embodiment, the variation information acquired as a PUF response is acquired in the form of a multi-bit, for example, 12-bit digital value Vout, where each bit corresponds to two output values, and the response data generating part 80 (key generating part 82) uses the two output values of the variation information as reliability information Q. As will be described in detail below, the difference between the two output values of the variation information, which is obtained as the CIS-PUF response, can be used to determine the likelihood of bit inversion. The response data generating part 80 determines reliability based on the difference between the two output values of the variation information acquired when a key is regenerated.

Figure 14A:
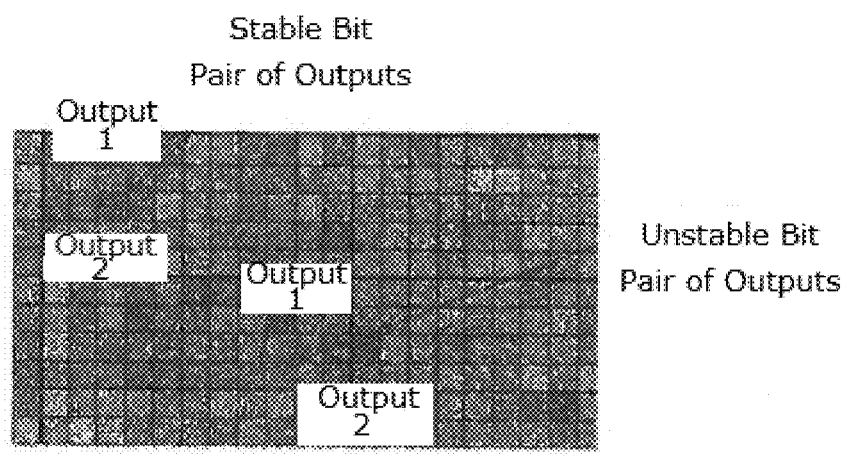
FIGS. 14A to 14C include histograms for the pair of outputs for the stable bit and the pair of outputs for the unstable bit in variation information, which is acquired as a PUF response by a CMOS image sensor PUF (CIS-PUF).
Figure 14B:
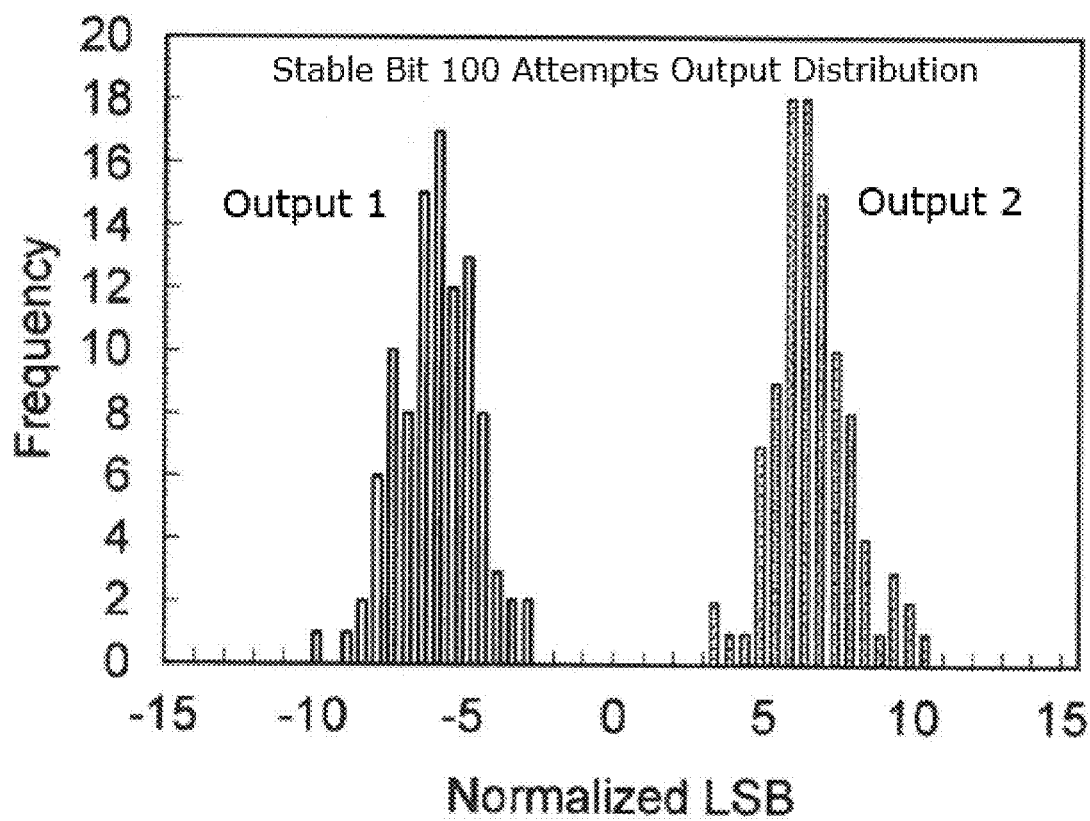
Figure 14C:
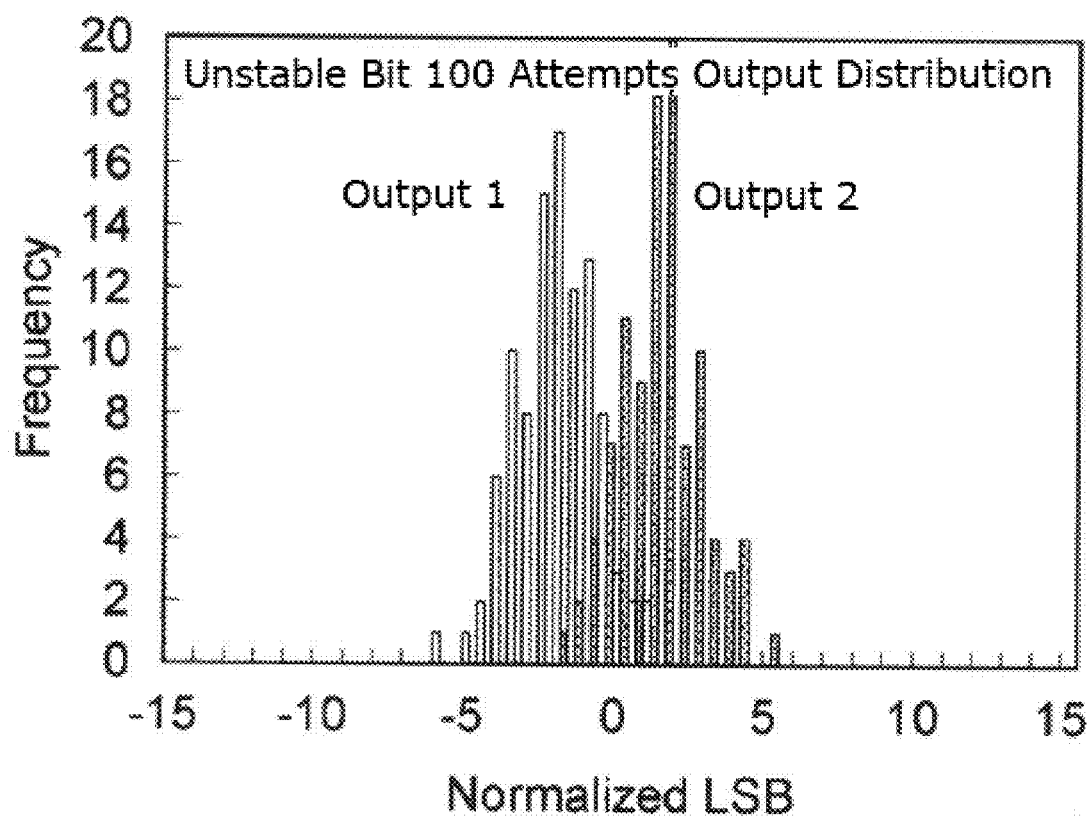

FIGS. 14A to 14C include histograms for the pair of outputs for the stable bit and the pair of outputs for the unstable bit in variation information, which is acquired as a PUF response by a CMOS image sensor PUF (CIS-PUF). FIG. 14A shows an example of the pixel part 20, FIG. 14B shows an output distribution for a stable bit obtained by 100 attempts, and FIG. 14C shows an output distribution for an unstable bit obtained by 100 attempts.

In the variation information of the pixels obtained as a CIS-PUF response, each bit corresponds to two outputs. The difference between the two outputs can be used to determine the likelihood of bit inversion. Therefore, even if reliability information as to inversion is not recorded in the helper data when an initial key is generated, reliability information can be determined based on the response data acquired when a key is regenerated and used for soft decision. FIGS. 14B and 14C are histograms for the pair of outputs for the stable bit and the pair of outputs for the unstable bit, which are obtained as a result of 100 attempts. When each bit corresponds to a first output and a second output, the first and second outputs both have a distribution with a constant σ around an average value and have similar shapes. The variations is affected by random noise, which accumulates as each attempt is made.

As described above, the present embodiment determines reliability based on the difference between the two output values of the variation information, which is acquired as a PUF response when a key is regenerated. The following briefly describes a column reading circuit arranged for each column and the pixel part. The column reading circuit includes an information acquiring part that constitutes the main part of the CMOS image sensor PUF (CIS-PUF) and that is suitable for acquiring variation information having two output values. The following then describes how to specifically generate a PUF response (variation information), how to set reliability information Q and an example configuration of a fuzzy extractor that is capable of performing soft decision, which provides for high correcting capability, by means of reliability information Q when a key is regenerated. The description of the fuzzy extractor includes the results of comparing, in terms of error correcting capability, a common fuzzy extractor (hard decision fuzzy extractor) and a fuzzy extractor that performs soft decision when an initial key is generated and a key is regenerated.

Figure 15:
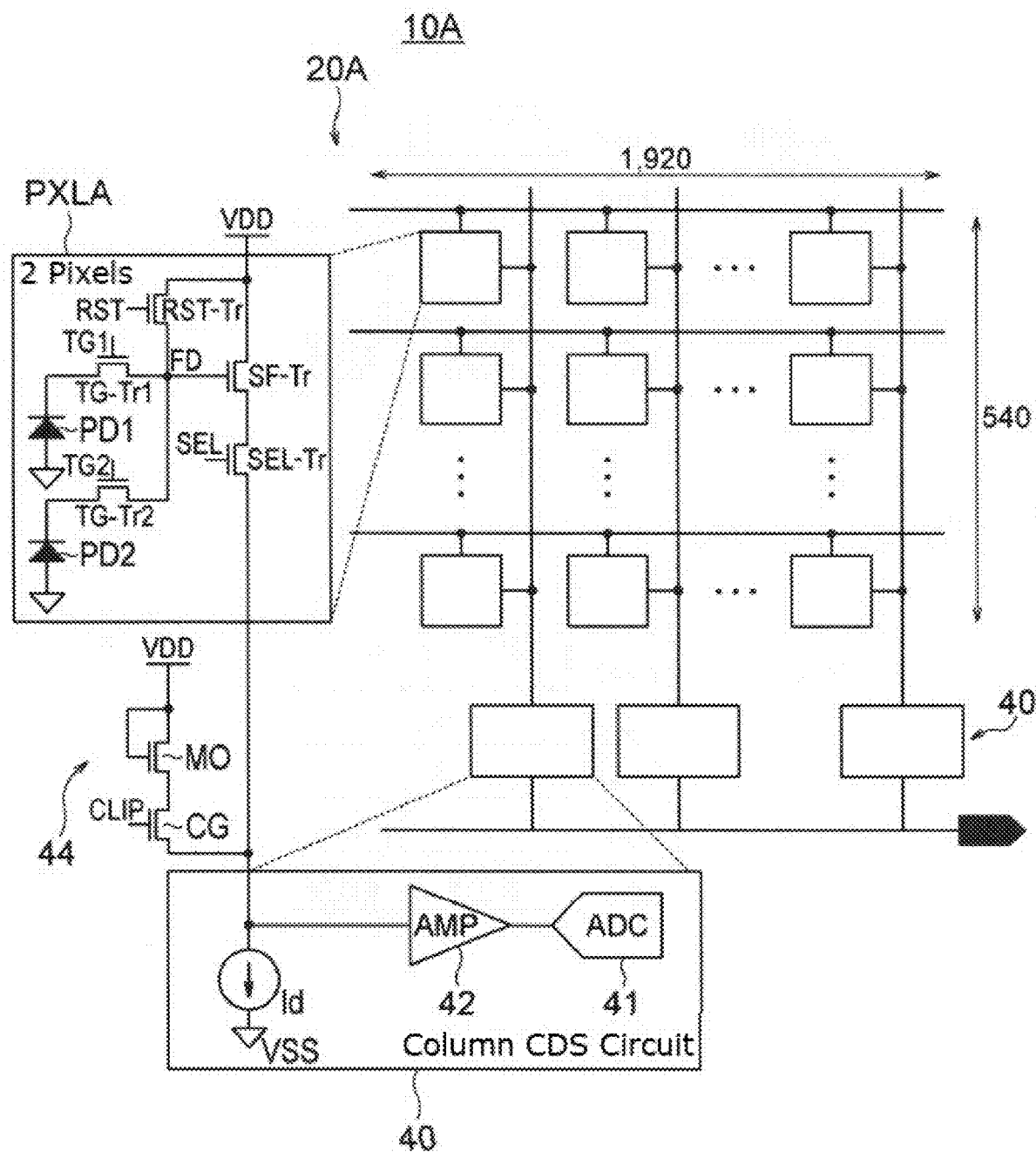
FIG. 15 briefly illustrates a column reading circuit of the embodiment arranged for each column and the pixel part of the embodiment, where the column reading circuit includes an information acquiring part that constitutes the main part of the CMOS image sensor PUF (CIS-PUF) and that is suitable for acquiring variation information having two output values.

FIG. 15 briefly describes the column reading circuit of the present embodiment arranged for each column and the pixel part. The column reading circuit includes an information acquiring part that constitutes the main part of the CMOS image sensor PUF (CIS-PUF) and that is suitable for acquiring variation information having two output values.

The pixel part 20A and column reading circuit 40 shown in FIG. 15 are configured to determine which one of vertically (in the top-to-bottom direction in FIG. 15) adjacent two pixels produces larger output (by performing subtraction or the like) to perform binarization, for the purposes of enhancing the reproducibility of the variation signal and improving the uniqueness of the variation pattern.

The pixel part 20A shown in FIG. 15 has a pixel sharing configuration such that one floating diffusion FD, one source follower transistor SF-Tr serving as a source follower element, one reset transistor RST-Tr serving as a reset element, and one selection transistor SEL Tr serving as a selection element are shared by a plurality of (in the present example, two) photodiodes PD1 and PD2, which are photoelectric converting elements, and a plurality of (in the present example, two) transfer transistors TG-Tr1, TG-Tr2, which are transfer elements.

In other words, the pixel PXLA of the CMOS image sensor shown in FIG. 15 includes the photodiodes PD1 and PD2, the transfer transistors TG-Tr1, TG-Tr2 driven by control signals TG1 and TG2, which are transfer clocks, the reset transistor RST-Tr driven by the control signal RST, which is a reset clock, the source follower (SF) transistor SF-Tr, and the selection transistor SEL-Tr driven by the control signal SEL, which is a selection clock. The two photodiodes PD1, PD2 share the reset transistor RST-Ti; source follower (SF) transistor SF-Tr, selection transistor SEL-Tr. This approach is widely used for recent fine pixels. Since PDs share the transistors, the PDs can occupy a large area relative to the predetermined pixel size, so that a larger region is capable of performing photoelectric conversion. This raises the sensitivity for detection of the incident light.

When the selection transistor SEL-Tr is turned on in a pixel, the power supply line VDD of the power supply voltage Vdd, the source follower (SF) transistor SF-Tr, the current source Id are connected in series in the pixel, to constitute a source follower circuit. This source follower circuit causes the voltage of the floating diffusion FD to be input into the ADC 41 via the AMP 42 of the reading circuit 40. The voltage of the floating diffusion FD is converted into a digital signal, which is output to an interface circuit, which is not shown in the drawings. A clip circuit 44 is arranged at the end of the array of pixels. A clip gate CG, which is driven by a control signal CLIP serving as a clip clock, and a diode-connected transistor MO are arranged at the end of the array of pixels, to limit the amplitude of the pixel output voltage. In this way, the clip circuit 44 is used to realize stable operation.

<Brief Description of CIS-PUF of FIG. 15>

The following now briefly describes the CIS-PUF shown in FIG. 15. The CIS-PUF uses the variations among the characteristics of the pixels of the CMOS image sensor to generate a PUF response (pixel variation information) unique to each device. As described above, the characteristics variations include fixed pattern noise (FPN) occurring at a fixed position and random noise randomly occurring independently from the positions of the pixels. In the normal operational mode MDU, the CMOS image sensor performs correlated double sampling (CDS), which calculates the difference between the reset potential (VRST) and the signal potential (VSIG) for each pixel, in order to eliminate the characteristics variations.

The CIS-PUF also operates in the response generation mode (PUF mode) MDR, in which the signals are read out without using the CDS, in order to acquire variation information for the purposes of generating a PUF response. In the output acquired in the PUF mode, the pixel variations can be dominant.

The solid-state imaging device (CMOS image sensor) 10A, which is a CIS-PUF, shown in FIG. 15 has an array of 1,920×1,080 pixels (full HD). In the solid-state imaging device (CMOS image sensor) 10A, two adjacent pixels in the vertical direction (in the top-to-bottom direction in the drawing) share a source follower transistor SF-Tr. Therefore, the solid-state imaging device (CMOS image sensor) 10A has 1,920×540 source follower transistors SF-Tr. In the PUF mode, the potential fed from the clip circuit 44 provided for each column is used as the reference potential, the difference is calculated between the reference potential and the reset potential of each pixel. In this way, pixel-wise variations is extracted.

<Generation of PUF Response in CIS-PUF in FIG. 15>

Figure 16:
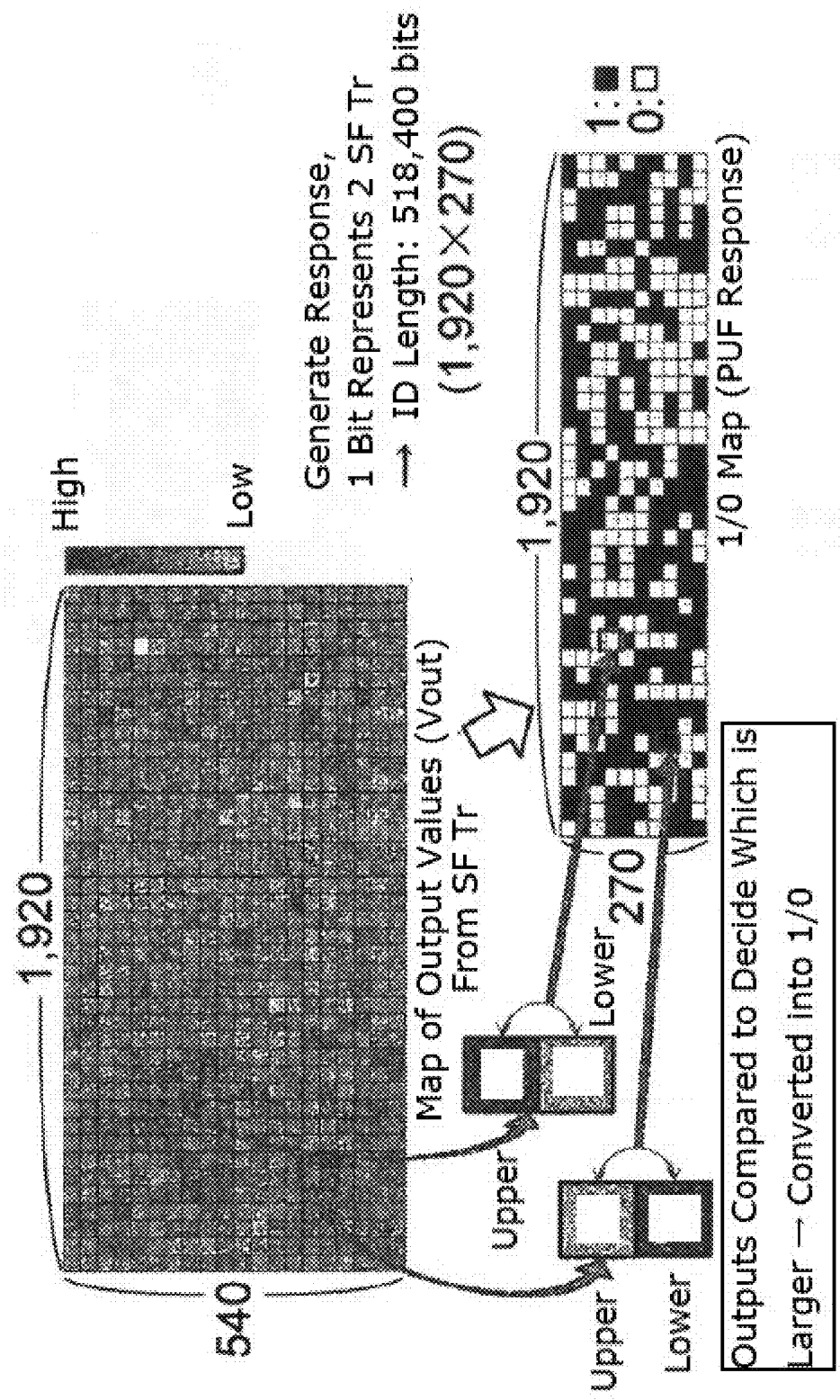
FIG. 16 shows how to generate a PUF response using pixel variations in the CIS-PUF of FIG. 15.

The following now briefly describes how to generate a PUF response at the CIS-PUF shown in FIG. 15. FIG. 16 shows how to generate a PUF response using pixel variations in the CIS-PUF of FIG. 15.

When generating a PUF response using the pixel variations, the CIS-PUF compares the output values Vout (the digital output from the AD converter 41) of the two source follower transistors SF-Tr adjacent to each other in the vertical direction (top-to-bottom direction) to determine which is larger to output one bit. In the example shown in FIG. 16, the output values Vout adjacent to each other in the vertical direction are compared against each other to determine which is larger. When the upper output value is larger than the lower output value (upper>lower), "1" is output. When the upper output value is smaller than the lower output value (upper<lower), "0" is output.

The actually measured CMOS image sensor has 1,920×540 source follower transistors SF-Tr. The output values from the source follower transistors SF-Tr adjacent to each other in the vertical direction are compared against each other to determine which is larger, so that 1,920×270 pieces of 1/0 data (PUF response) are generated. Accordingly, one CIS-PUF chip can produce a response of approximately 0.5M bits.

Figure 17:
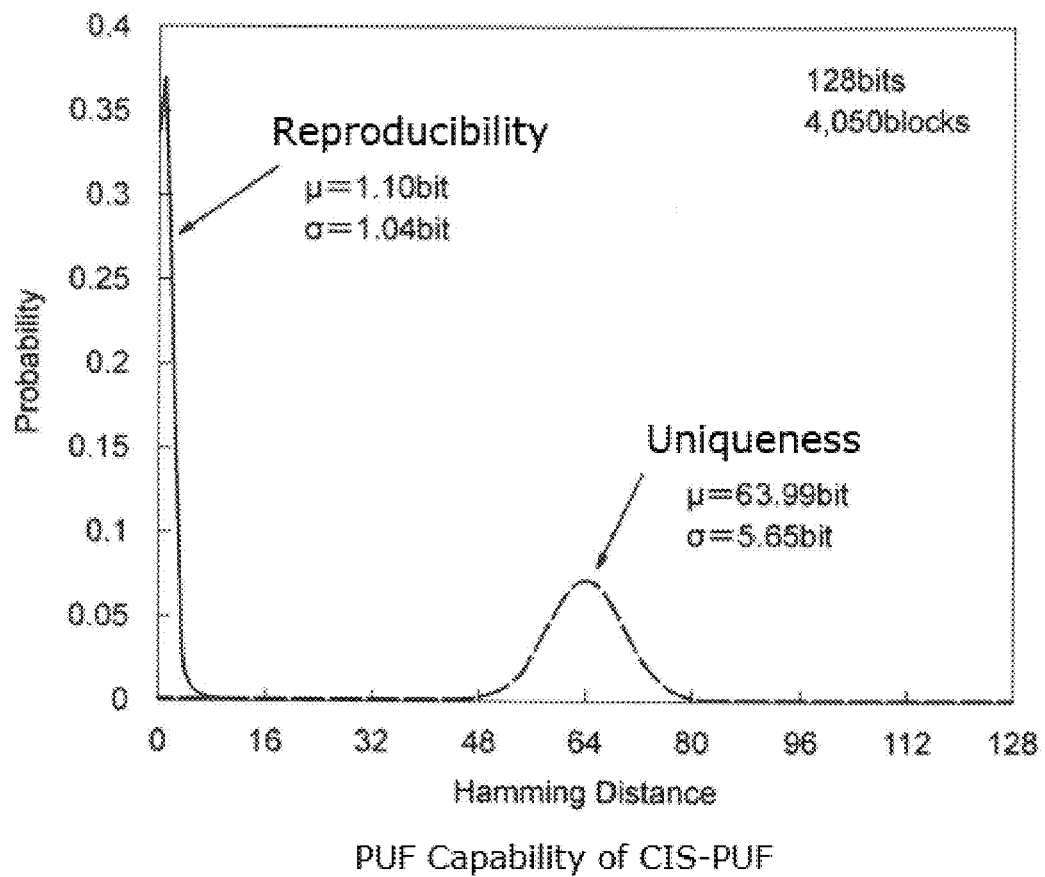
FIG. 17 illustrates the reproducibility and uniqueness exhibited by the PUF capability achieved by the response generating scheme shown in FIGS. 15 and 16.

FIG. 17 illustrates the reproducibility and uniqueness of a PUF function achieved by the response generating scheme shown in FIGS. 15 and 16.

As for the reproducibility shown in FIG. 17, an average is calculated based on the outputs of 100 attempts (100 images) and used as a reference response. FIG. 17 shows the humming distance (HD) calculated between the reference response and the response of each attempt (each image). The response made up by 1,920×270 bits is partitioned every 128 bits to obtain 4,050 blocks, and the distribution is obtained based on the results of 4,050 blocks×15 chips. The uniqueness shown in FIG. 17 is calculated as the humming distances (HDs) between the reference responses of different 15 chips. In FIG. 17, the uniqueness is shown as a distribution of 4,050 blocks, which is produced by partitioning the responses every 128 bits, like the reproducibility.

As shown in FIG. 17, extremely high reproducibility is achieved. The average value is 1.10 bits from among 128 bits (the inversion likelihood=0.86%), and the largest value is 8 bits (the inversion likelihood=6.25%). Similarly, high uniqueness can be proved. The average value is 63.99 bits or approximately equal to an ideal value (64 bits).

<Unstable Bit of CIS-PUF>

The following studies the unstable bit of the CIS-PUF shown in FIG. 15. FIGS. 18A and 18B show stable and unstable bits of a PUF response obtained by the response generating scheme shown in FIGS. 15 and 16. FIG. 18A shows a distribution of outputs from two source follower transistors SF-Tr for the stable bit, which results from 100 attempts. FIG. 18B shows a distribution of outputs from two source follower transistors SF-Tr for the unstable bit, which results from 100 attempts.

FIGS. 18A and 18B also show an average output and identify the difference between two average outputs by ΔVout. These average outputs are affected by the FPN (fixed pattern noise), which is a component of the variations occurring in the CMOS image sensor, and one average output is defined for each source follower transistor SF-Tr output. On the other hand, the distribution around the average output is affected by the random noise, and each SF-Tr output has a similar distribution with constant σ.

As is apparent from FIGS. 18A and 18B, the difference ΔVout is large for the stable bit relative to the variations in output among respective attempts. As a result, the relation between the outputs as to which is larger is not inverted depending on the respective attempts. On the other hand, the difference ΔVout between the average outputs is small for the unstable bit. As a result, the relation between the outputs as to which is larger can be inverted depending on the respective attempts and bit inversion may occur. Considering the above, the CIS-PUF shown in FIG. 15 and the like is capable of estimating the likelihood of bit inversion for a pair of source follower transistors SF-Tr by referring to the difference between their average outputs Δvout.

The key generating part 82 (FIGS. 5 and 6) uses at least one selected from the group consisting of the pixel variation information and the reading circuit 40 variation information acquired by and fed from the information acquiring part 81 to generate a unique key. The key generating part 82 feeds the generated unique key KY to the identification data generating part 84. The key generating part 82 generates the unique key KY, for example, in a period other than the period in which the effective pixels of the pixel part 20 are read (for example, in a blank period).

The image data generating part 83 illustrated in FIGS. 5 and 6 performs predetermined signal processing on the read-out signal that has been read by the reading circuit 40 in the normal reading mode and subjected to predetermined processing, to generate two-dimensional image data IMG shown in, for example, FIG. 5. The image data generating part 83 feeds the generated image data IMG to the integrating part 85.

The image data generating part 83 feeds the acquired data AQD acquired from the solid-state imaging device 10 to the identification data generating part 84. Here, the acquired data AQD is at least one selected from the group consisting of pixel data, date data, temperature data, Global Positioning System (GPS) data.

The identification data generating part 84 combines the unique key KY generated by the key generating part 82 with the acquired data AQD acquired from the solid-state imaging device 10, to generate identification data DSCD. The identification data generating part 84 feeds the generated identification data DSCD to the integrating part 85.

As shown in FIG. 6, the integrating part 85 integrates the identification data DSCD generated by the identification data generating part 84 with the image data IMG generated by the image data generating part 83 based on the read-out data, and outputs the result as a final response data RPD from the sensor chip. For example, the integrating part 85 integrates the data such that the result contains, in the following order, a header HD, the identification data DSCD, and the image data IMG, as shown in FIG. 6.

<Example Configuration of Key Generating Part 82)

The following describes a specific example configuration of the key generating part 62 and a method of setting reliability information. In order to enhance the key reproducibility, the key generating part 82 relating to the present embodiment uses a fuzzy extractor for the generation of the key. The fuzzy extractor is an arithmetic logic unit for converting noisy data into unique key information and designed to provide the same output in response to a rather stable input.

In the present embodiment, the key generating part 82 of the response data generating part 80 uses a fuzzy extractor. When regenerating a key, the key generating part 82 generates a unique key using the helper data acquired in initial key generation, variation information acquired when the key is regenerated, and reliability information determined based on the variation information acquired when the key is regenerated. As described above, in the present embodiment, the variation information acquired as a PUF response is acquired as a multi-bit (in the present example, 12-bit) digital value, where each bit corresponds to two output values, and the key generating part 82 uses, as reliability information, the two output values of the variation information acquired as a PUF response.

In the present embodiment, as described above, the difference between the two output values of the variation information, which is acquired as a PUF response, can be used to determine the likelihood of bit inversion. The key generating part 82 determines reliability based on the difference between the two output values of the variation information acquired when a key is regenerated.

The key generating part 82 can employ, for example, two approaches to determine and set reliability.

<First Reliability Setting Method>

According to a first reliability setting method, the key generating part 82 assumes that a first difference $\Delta$Vout_get between two output values of the variation information acquired when a key is regenerated is the same as a second difference $\Delta$Vout between the averages of the output values. Under this assumption, the key generating part 82 postulates that, as the first difference $\Delta$Vout_get increases, the area of the overlap between the two output value distributions decreases and the likelihood of bit inversion decreases, and as the first difference $\Delta$Vout_get decreases, the area of the overlap between the two output value distributions increases and the likelihood of bit inversion increases. Under these assumptions, the key generating part 82 sets the reliability. The key generating part 82 sets the reliability such that the reliability takes a minimum when the area of the overlap between the two output value distributions, which is estimated based on the first difference $\Delta$Vout_get, takes a maximum and the reliability increases toward the maximum as the area of the overlap decreases. Alternatively, the key generating part 82 sets the reliability such that the reliability takes a maximum when the area of the overlap between the two output value distributions, which is estimated based on the first difference $\Delta$Vout_get, takes a minimum and the reliability decreases toward the minimum as the area of the overlap increases.

<Second Reliability Setting Method>

According to a second reliability setting method, the key generating part 82 assumes that a first difference $\Delta$Vout_get between two output values of the variation information acquired when a key is regenerated is different from a second difference $\Delta$Vout between averages of the output values, that acquired values vary among respective attempts, and that there are both cases where the first difference $\Delta$Vout_get is larger than the second difference $\Delta$Vout and where the former is smaller than the latter. Based on these assumptions, the key generating part 82 considers how far the first difference $\Delta$Vout_get is different from the second difference $\Delta$Vout when setting the reliability. The key generating part 82 assumes that the first difference $\Delta$Vout_get is within the range of +−—a of the second difference $\Delta$Vout and considers how far the first difference $\Delta$Vout_get is different from the second difference $\Delta$Vout when setting the reliability.

<Example Configuration of Suitable Fuzzy Extractor>

The following describes an example configuration of a fuzzy extractor that is capable of performing soft decision that can provide for high correcting capability by means of reliability information Q when a key is regenerated. The description of the fuzzy extractor includes the results of comparing, in terms of error correcting capability, a common fuzzy extractor (hard decision fuzzy extractor) and a fuzzy extractor that performs soft decision when an initial key is generated and a key is regenerated.

Figure 19A:
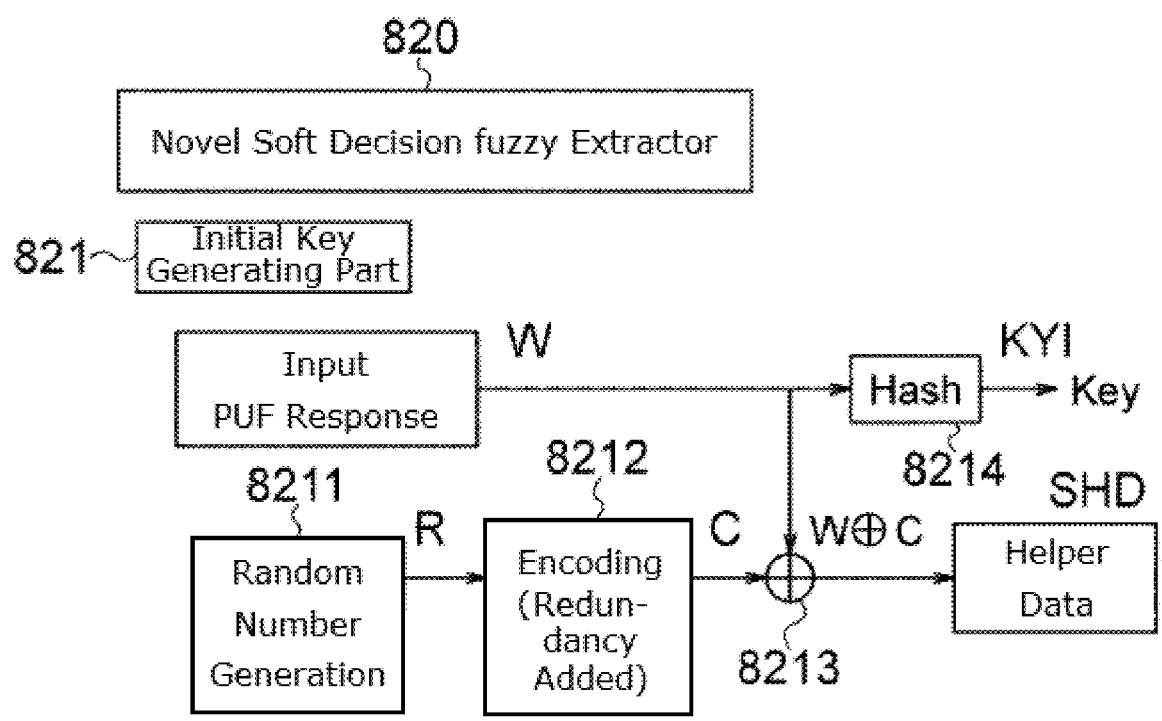
FIGS. 19A and 19B show an example configuration of a fuzzy extractor applicable to a unique key output part of a key generating part relating to the embodiment of the present invention.
Figure 19B:
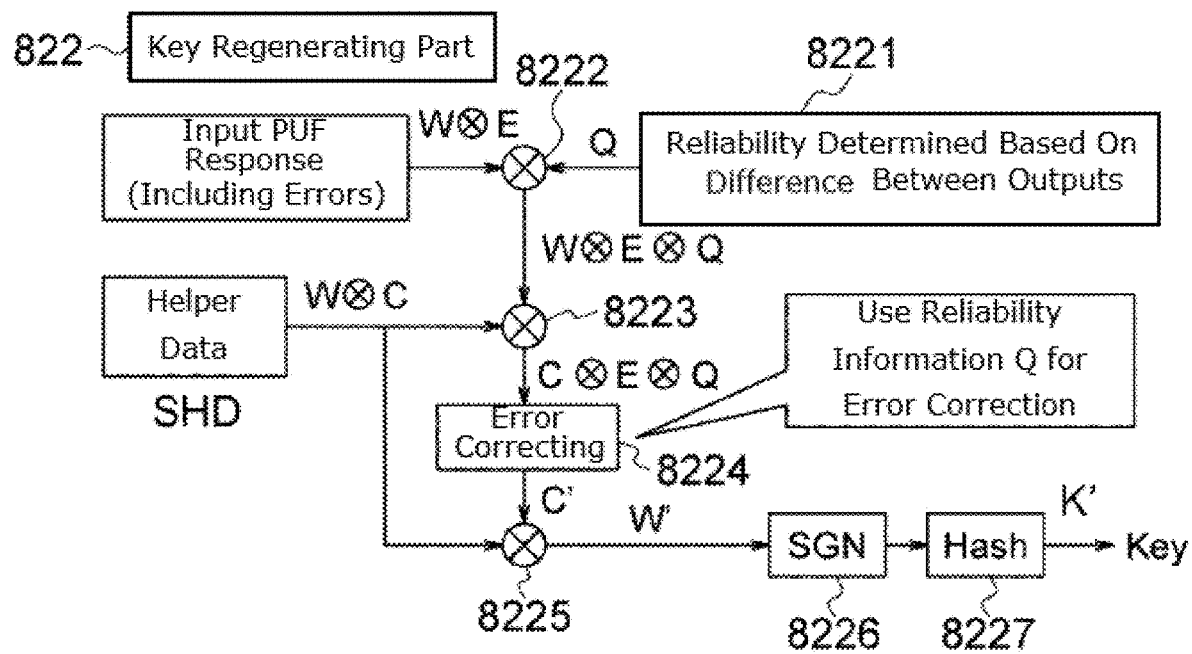

FIGS. 19A and 19B show an example configuration of a fuzzy extractor applicable to a unique key output part of the key generating part relating to the embodiment of the present invention. A fuzzy extractor 820 includes an initial key generating part 821 shown in FIG. 19A and a key regenerating part 822 shown in FIG. 19B.

As shown in FIG. 19A, the initial key generating part 821 includes a random number generator 8211 formed by, for example, a ring oscillator (RNG), an encoding part 8212, an exclusive OR circuit (XOR) 8213, and a first hash part (Hash) 8214.

In the initial key generating part 821, the variation information acquired by the information acquiring part 81 as a PUF response is input into the XOR 8213 and the first hash part 8214 as the input data W. The first hash part 8214 generates an initial key KYI based on the input data W. The initial key KYI is fed to the identification data generating part 84. The initial key KYI is written into the memory 86 as key data at the time of shipping, for example.

In the initial key generating part 821, the random number R generated by the random number generator 8211 is used to generate a codeword C of an error correction code by the encoding part 8212, and the codeword C is fed to the XOR 8213. The XOR 8213 calculates an exclusive OR between the input data W and the codeword C, so that a 1/0 bit string or helper data SHD (WxorC) is generated. Unlike key data, the helper data SHD (WxorC) does not need to be concealed and is stored in the memory 86. The helper data SHD stored in the memory 86 is used by the key regenerating part 822 as base data to regenerate a key.

As shown in FIG. 19B, the key regenerating part 822 includes reliability information acquiring part 8221, a first multiplier 8222, a second multiplier 8223, an error correcting part 8224, a third multiplier 8225, a code converting part (SGN) 8226 and a second hash part (Hash) 8227.

In the key regenerating part 822, the reliability information acquiring part 8221 acquires reliability information Q determined based on variation information, which is acquired as a response including an error when a key is regenerated, and feeds the reliability information Q to the first multiplier 8222. The first multiplier 8222 performs a multiplication on the reliability information Q and the variation information W(x)E, which is acquired as a response including an error when a key is regenerated, to acquire first data W(x)E(x)Q and feeds the first data W(x)E(x)Q to the second multiplier 8223. Here, the variation information W(x)E is provided as −1/1 data, which is obtained by converting the I/O data, in order to be compatible with soft decision. The second multiplier 8223 performs a multiplication on the helper data W(x)C and the first data W(x)E(x)Q including the reliability information Q to acquire second data C(x)E(x)Q, which results from a multiplication on the codeword C of the error correction code, the error component E and the reliability information Q and feeds the second data C(x)E(x)Q to the error correcting part 8224. Here, the helper data W(x)C is also provided as −1/1 data, which is obtained by converting the 1/0 data, in order to be compatible with soft decision. The error correcting part 8224 decodes the second data C(x)E(x)Q using correlation decoding using the reliability information Q to acquire an estimated codeword C', and feeds the estimated codeword C' to the third multiplier 8225. The codes are converted such that "0" and "1" are respectively replaced with "1" and "−1" in order to calculate an inner product in relation to the correlation decoding used for this soft decision. The third multiplier 8225 performs a multiplication on the estimated codeword C' provided by the error correcting part 8224 and the helper data W(x)C to acquire estimated variation information W', and feeds the estimated variation information W' to the code converting part 8226. The code converting part 8226 converts the −1/1 data back into 1/0 data, and feeds the result to the second hash part 8227. The second hash part 8227 subjects the estimated variation information W' to a hash function to acquire a hash value and outputs the hash value as a regenerated key K'.

If the estimated codeword C' provided by the error correcting part matches the codeword C obtained when the initial key is generated, the regenerated key is deemed to match the initial key.

As described above, the difference between the two output values of the variation information acquired as a PUF response can be used to determine the likelihood of bit inversion. The key regenerating part 822 in the key generating part 82 determines reliability based on the difference between the two output values of the variation information acquired when a key is regenerated.

The following describes how to determine and set the reliability by the reliability information acquiring part 821 of the soft-decision key regenerating part 822 more specifically with reference to the drawings.

According to the above description of the stable and unstable bits of the CIS-PUF, the second difference ΔVout, which is the difference between average values, is used by referring to the distributions of the outputs from two source follower transistors SF-Tr adjacent to each other in the vertical direction (the top-to-bottom direction). In the present embodiment, the reliability information Q of the CIS-PUF is generated based on the difference in output between the vertically adjacent two source follower transistors SF-Tr. The fuzzy extractor 820, which is employed in the present embodiment, assumes that reliability is acquired with one shot when a key is regenerated. In the present embodiment, the difference in output value acquired with one shot between the vertically adjacent two source follower transistors SF-Tr is referred to as the first difference ΔVout_get.

Figure 20:
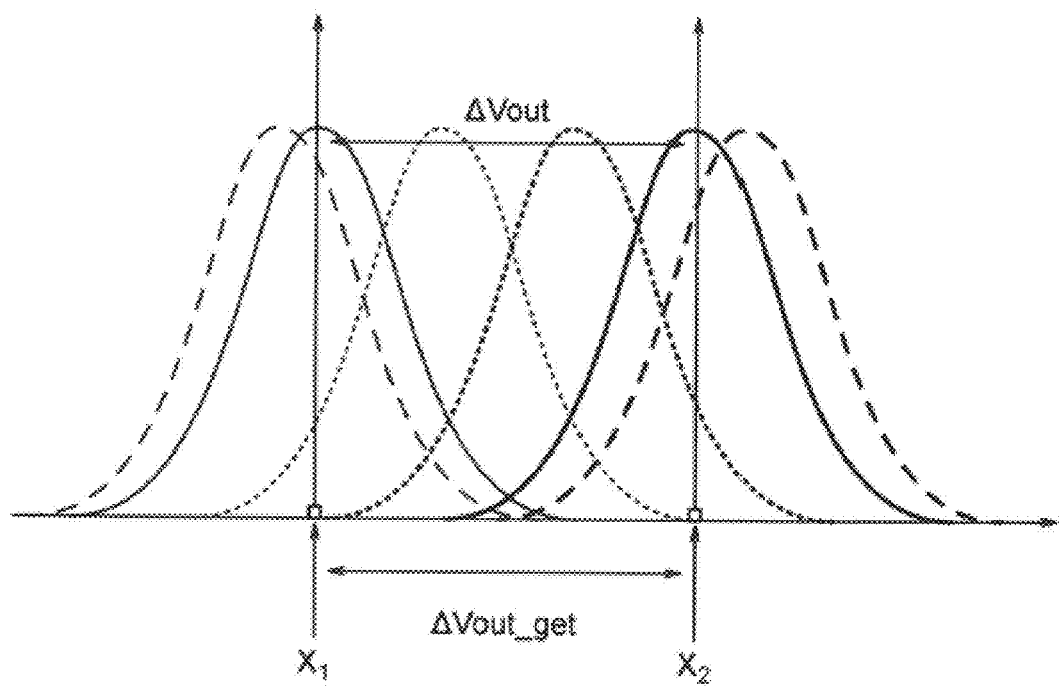
FIG. 20 is used to more specifically illustrate a method of determining and setting reliability relating to the embodiment of the present invention.

FIG. 20 is used to more specifically illustrate a method of determining and setting reliability relating to the embodiment of the present invention.

<Specific Description of First Reliability Setting Method>

According to the first reliability setting method, as shown in FIG. 20, the key generating part 82 assumes that the first difference ΔVout_get between two output values of the variation information acquired when a key is regenerated is the same as the second difference ΔVout between averages of the output values. Thus, ΔVout_get=ΔVout. In this case, if the first difference ΔVout_get is large, the distributions of the outputs from two source follower transistors SF-Tr do not overlap, and there is approximately zero probability of bit inversion. On the other hand, as the first difference ΔVout_get decreases, the area of the overlap between the distributions of the outputs from two source follower transistors SF-Tr increases, and there is a higher probability of bit inversion. Based on this, the key generating part 82 postulates that, as the first difference ΔVout_get increases, the area of the overlap between two output value distributions decreases and the likelihood of bit inversion decreases and that, as the first difference ΔVout_get decreases, the area of the overlap between two output value distributions increases and the likelihood of bit inversion increases when setting the reliability.

The key generating part 82 sets the reliability such that the reliability takes a minimum when the area of the overlap between the two output value distributions, which is estimated based on the first difference ΔVout_get, takes a maximum and the reliability increases toward the maximum as the area of the overlap decreases. Alternatively, the key generating part 82 sets the reliability such that the reliability takes a maximum when the area of the overlap between the two output value distributions, which is estimated based on the first difference ΔVout_get, takes a minimum and the reliability decreases toward the minimum as the area of the overlap increases.

To be more specific, when a key is regenerated, two outputs are acquired for each bit. The difference between these outputs is referred to as the first difference ΔVout_get. A single attempt does not tell how far the first difference ΔVout_get is different from the difference between their respective most frequent values (or average values) obtained by statistically processing the outputs of multiple attempts (this is referred to as the second difference ΔVout). A case is assumed where the two acquired outputs are the most frequent values (average values). In other words, ΔVout=ΔVout_get. Subsequently, output distributions are statistically derived (for example, normal distributions with certain σ), and the area of the overlap between the two output distributions is calculated based on the second difference ΔVout. When the area of the overlap is 100%, the probability of the inversion is 50% and the reliability is set to 0. When the area of the overlap is 0%, the probability of the inversion is 0% and the reliability is set to 1. These cases are interpolated using a suitable function (for example, linear interpolation).

<Specific Description of Second Reliability Setting Method>

The following describes the second reliability setting method, which is more accurate than the first reliability setting method. FIGS. 21A and 21B are first views used to illustrate the second reliability setting method relating to the second embodiment of the present invention. FIGS. 22A to 22D are second views used to illustrate the second reliability setting method relating to the embodiment of the present invention.

According to the second reliability setting method, the key generating part 82 assumes that the first difference ΔVout_get between two output values of the variation information acquired when a key is regenerated is different from a second difference ΔVout between averages of the output values, that acquired values vary among respective attempts, and that there are both cases where the first difference ΔVout_get is larger than the second difference ΔVout and where the former is smaller than the latter. Based on these assumptions, the key generating part 82 considers how far the first difference ΔVout_get is different from the second difference ΔVout when setting the reliability. The key generating part 82 assumes that the first difference ΔVout_get is within the range of +x (+−α) of the second difference ΔVout and considers how far the first difference ΔVout_get is different from the second difference ΔVout when setting the reliability.

According to the second reliability setting method, the outputs corresponding to one bit are each assumed to take a normal distribution around the most frequent value with constant σ. Under this assumption, the probability that an acquired output is shifted from the most frequent value is taken into consideration when the second difference ΔVout is calculated. Specifically, as shown in FIG. 21B, "a" denotes how much an acquired left output is shifted to the left from the most frequent value ("a" takes a negative value when the acquired left output is shifted to the right), and "b" denotes how much an acquired right output is shifted to the right from the most frequent value ("b" takes a negative value when the acquired right output is shifted to the left). Thus, ΔVout=ΔVout_get−a−b.

Figure 22A:
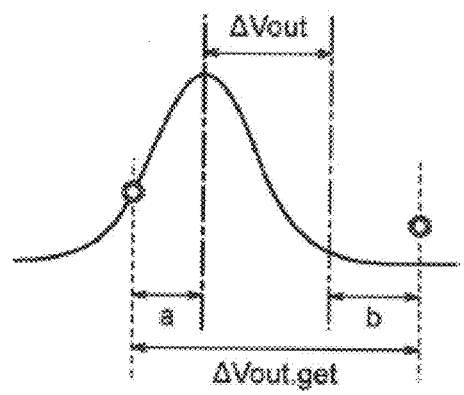
FIGS. 22A to 22D are second views used to illustrate the second reliability setting method relating to the embodiment of the present invention.
Figure 22B:
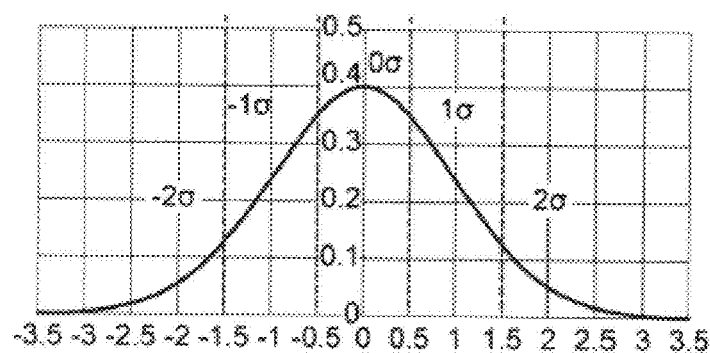
Figures 22C, 22D:
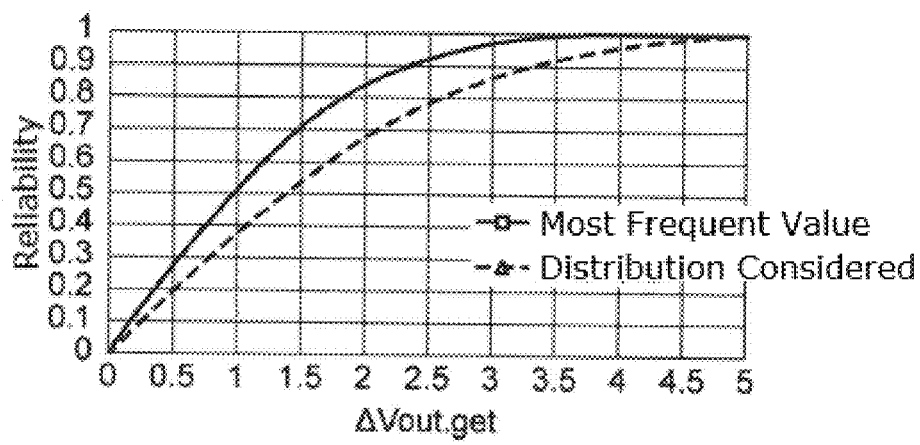

The probabilities of the respective values of "a" and "b" are calculated in the manner shown in FIGS. 22A to 22D. For example, if the value of a (the same applies to b) is within the range of +−0.5σ of the average value of the normal distribution, the output is moved to the average value. In this case, a (b)=0. If the value of a (b) is within the range of 1σ, the output is moved such that a(b)=+−1σ. If the value of a (b) is within the further outer range, the output is moved such that a(b)=+−2σ. The probabilities of the respective values of "a" and "b" are as shown in the table in FIG. 22D. These probabilities are multiplied by the reliability, which is calculated based on the second difference ΔVout (ΔVout=ΔVout_get−a−b), and the sum is calculated. The results are shown in FIG. 22C.

Figure 23:
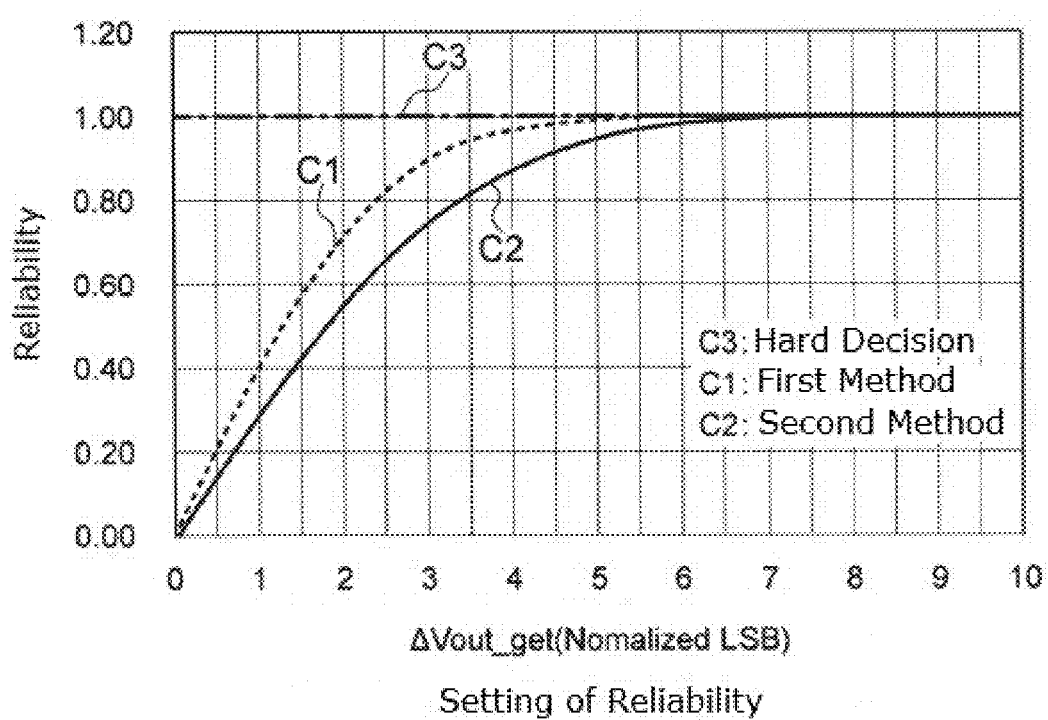
FIG. 23 illustrates how reliability is related to a first difference ΔVout_get for first and second methods of setting reliability relating to embodiments of the present invention and a comparative example or a decision method using a common hard decision fuzzy extractor.

FIG. 23 illustrates how the reliability is related to the first difference ΔVout_get for the first and second methods of setting reliability relating to an embodiment and a comparative example or a decision method using a common hard decision fuzzy extractor. In FIG. 23, a characteristic curve C1 represents how the reliability obtained by the first reliability setting method is related to the first difference ΔVout_get, a characteristic curve C2 represents how the reliability obtained by the second reliability setting method is related to the first difference ΔVout_get, and a characteristic curve C3 represents how the reliability obtained by the hard decision method or comparative example is related to the first difference ΔVout_get.

As is apparent from FIG. 23, the second reliability setting method is more accurate than the first reliability setting method.

<Description of Hard Decision Fuzzy Extractor and Conventional Soft Decision Fuzzy Extractor as Comparative Examples>

The following describes a hard decision fuzzy extractor and a conventional soft decision fuzzy extractor as comparative examples. The following also studies the error correcting capabilities or the like of the fuzzy extractor relating to the embodiment of the invention, and those of the hard decision fuzzy extractor and conventional soft decision fuzzy extractor introduced as comparative examples.

<Description of Hard Decision Fuzzy Extractor as Comparative Example>

The following describes a hard decision fuzzy extractor as a comparative example.

Figure 24A:
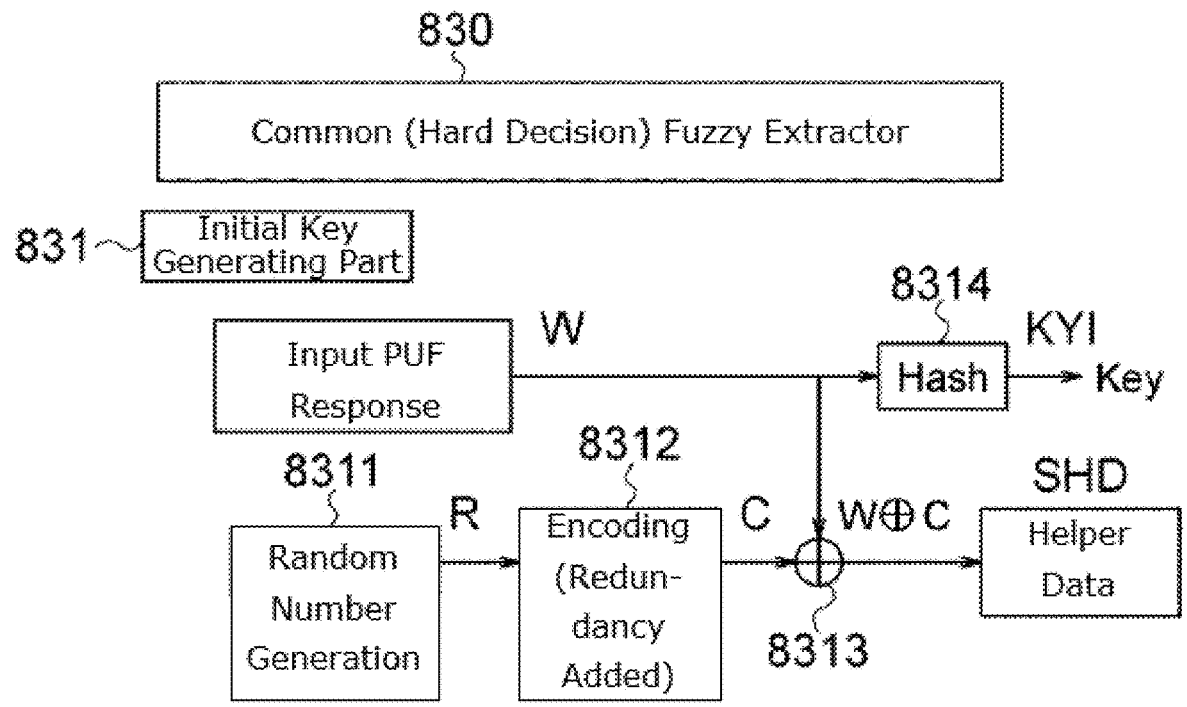
FIGS. 24A and 24B show an example configuration of a hard decision fuzzy extractor as a comparative example.
Figure 24B:
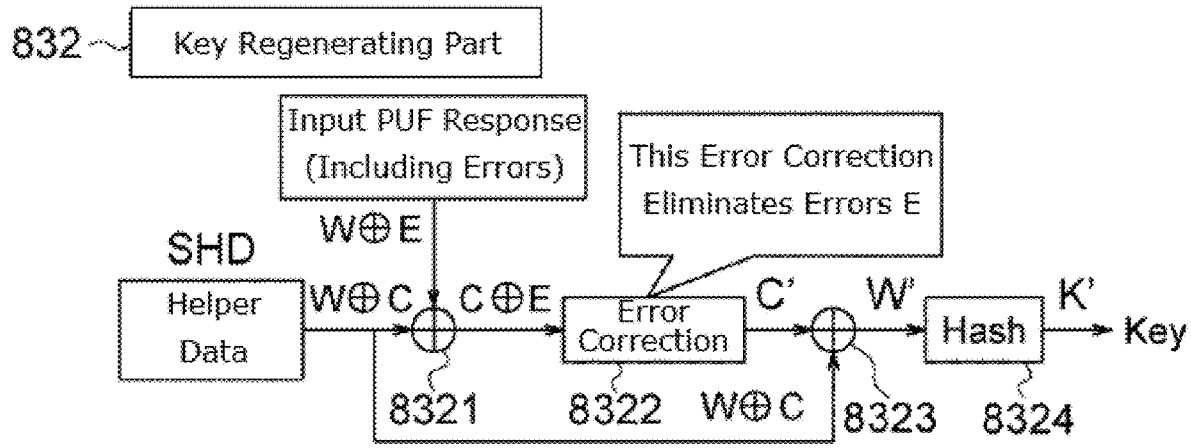

FIGS. 24A and 24B show an example configuration of a hard decision fuzzy extractor as a comparative example. A fuzzy extractor 830 shown in FIGS. 24A and 24B includes an initial key generating part 831 shown in FIG. 24A and a key regenerating part 832 shown in FIG. 24B.

As shown in FIG. 24A, the initial key generating part 831 includes a random number generator 8311 formed by, for example, a ring oscillator (RNG), an encoding part 8312, an exclusive OR circuit (XOR) 8313, and a first hash part (Hash) 8314.

In the initial key generating part 831, the variation information acquired by the information acquiring part 81 as a PUF response is input as the input data W into the XOR 8313 and the first hash part 8314. The first hash part 8314 generates an initial key KYI based on the input data W. The initial key KYI is fed to the identification data generating part 84. The initial key KYI is written into the memory 86 as key data at the time of shipping, for example. For example, the initial key data may be written into a memory such as an electronic fuse (efuse) at the time of shipping of the chip, which can be controlled by software to blow. In this way, the reproducibility of the key data can be reliably protected.

In the initial key generating part 831, the random number R generated by the random number generator 8311 is used to generate a codeword C of an error correction code by the encoding part 8312, and the codeword C is fed to the XOR 8313. The XOR 8313 calculates an exclusive OR between the input data W and the codeword C, so that a 1/0 bit string or helper data SHD (WxorC) is generated. Unlike key data, the helper data SHD (WxorC) does not need to be concealed and is stored in the memory 86. The helper data SHD stored in the memory 86 is used by the key regenerating part 832 as base data to regenerate a key.

As shown in FIG. 24B, the key regenerating part 832 includes an exclusive OR circuit (XOR) 8321, an error correcting part 8322, an exclusive OR circuit (XOR) 8323, and a second hash part (Flash) 8324.

In the key regenerating part 832, the input data (WxorE), which includes pixel variation information acquired by the information acquiring part 81 and containing errors, and the helper data SHD (WxorC) stored in the memory 86 are input into the XOR 3221. The helper data SHD (WxorC) is also input into the XOR 8323. The XOR 8321 calculates an exclusive OR between the input data (WxorE) and the helper data WxorC, and the result is fed as data (CxorE) into the error correcting part 8322. The error correcting part 8322 decodes the data (CxorE), so that an estimated codeword C' having the error E eliminated is generated. The estimated codeword C' is fed to the XOR 8323. The XOR 8323 calculates an exclusive OR between the estimated codeword C' and the helper data (WxorC), and the result is input as estimated data W' into the second hash part 8324. The second hash part 8324 then generates a regenerated key K' based on the input estimated data W The regenerated key KY is fed to the identification data generating part 84. If the input data W has a little noise and the data (CxorE) is capable of being corrected, C'=C, W' =W and the key is regenerated. In this case, the regenerated key matches the initial key.

The error correction codes used for the decision is first-order Reed-Muller codes (RM codes). This type of codes is relatively simply structured and enables efficient encoding. The present embodiment is described under a postulate that a small-scale RM(8,4,4) code is used among the first-order RM codes. According to this code, 4 information bits is used to generate an 8-bit codeword, and codewords have at least 4-bit humming distance (HD). The present embodiment is thus capable of correcting an error in 1 of 8 bits with an entropy of 4 bits. To use the RM(8,4,4) code, the probability that an 8-bit PUF response includes n error bits was calculated.

Decoding is further described with reference to the Reed-Muller (RM) codes. As mentioned above, RM(8,4,4) code is taken as an example. The length of the code is 8 bits, and the entropy is 4 bits. Thus, $2^4$=16 (when the 8 bits are fully used, $2^8$=256) codes are used, and the minimum humming distance (HD) for all of the codes is 4 bits.

The base vector of the RM(8,4,4) code to be used is represented by the following expression.

$$\vec{\alpha_1} = 1\ 1\ 1\ 1\ 1\ 1\ 1\ 1$$

$$\vec{\alpha_2} = 1\ 1\ 1\ 1\ 0\ 0\ 0\ 0$$

$$\vec{\alpha_3} = 1\ 1\ 0\ 0\ 1\ 1\ 0\ 0$$

$$\vec{\alpha_4} = 1\ 0\ 1\ 0\ 1\ 0\ 1\ 0$$

For the 4-bit information a1, a2, a3 and a4, the RM codes is represented by the following expression.

$$\vec{v} = a_1\vec{\alpha_1} + a_2\vec{\alpha_2} + a_3\vec{\alpha_3} + a_4\vec{\alpha_4}$$

Figure 30:
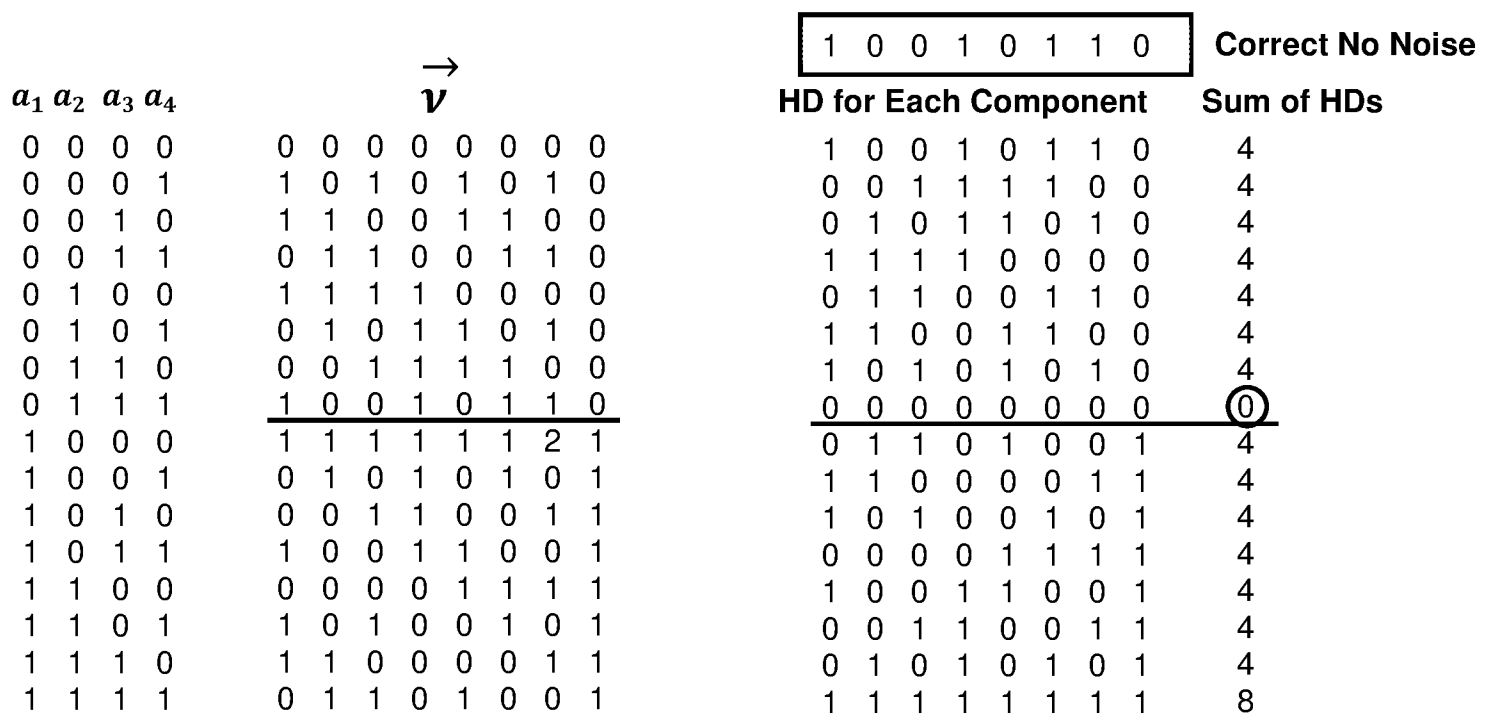

FIG. 30 shows the RM codes are assigned to all of the four bits.

Figure 31:
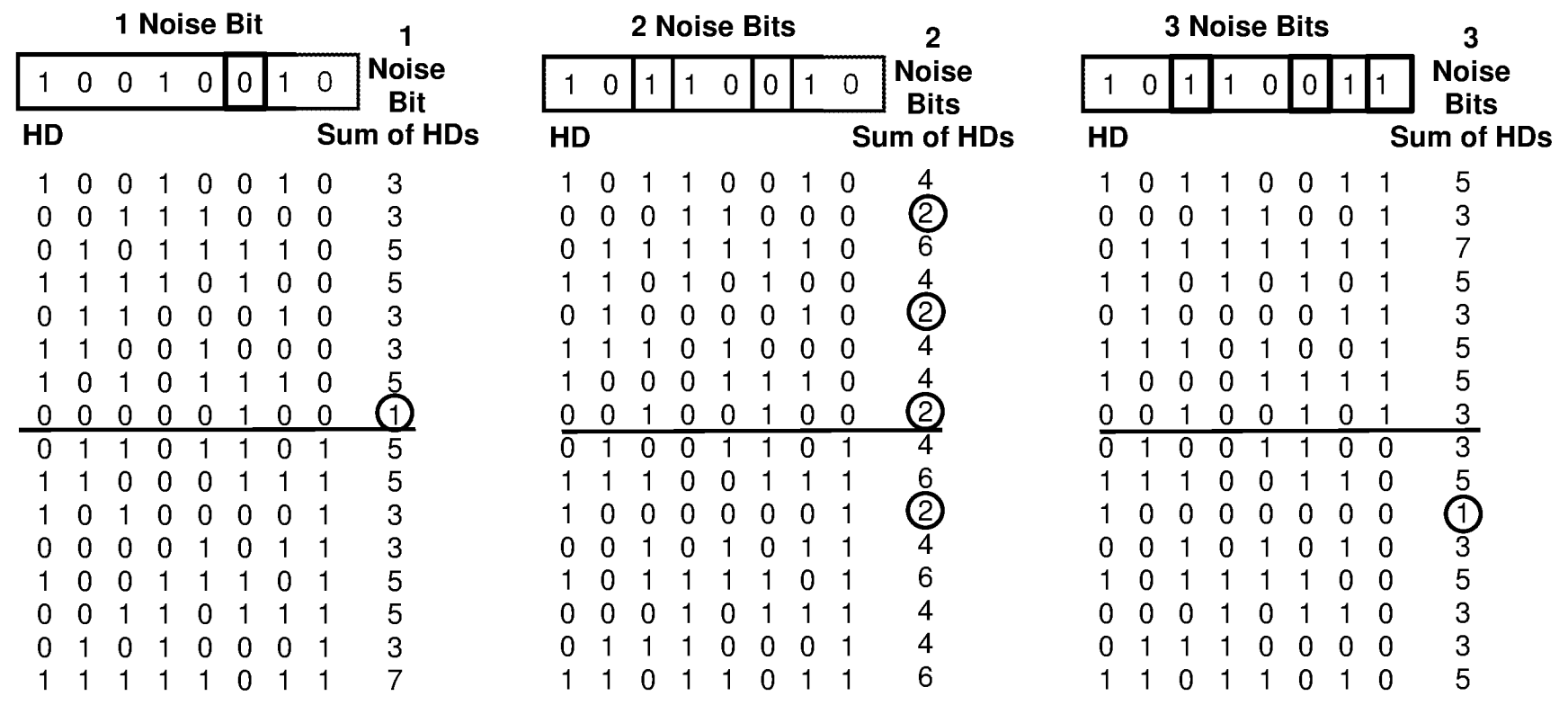

FIG. 31 shows the humming distance (HD) between the code of a regenerated response containing noise and the other codes. If the code has noise in one bit, the HD between the code and the original correct code takes the smallest value. The code can be judged as the true code. If the code has noise in two bits, there are a plurality of candidates exhibiting a HD of 2. Thus, the true code cannot be decided. If the code has noise in three bits, the smallest HD is found between the code and a different code. Thus, a wrong decision is made. For the reasons stated above, the RM(n, k,d) code can perform regeneration successfully as long as noise (inversion) is in d/2-1 bits or less.

<Description of Conventional Soft Decision Fuzzy Extractor as Comparative Example>

The following describes a conventional soft decision fuzzy extractor as a comparative example.

A conventional soft decision fuzzy extractor acquires a response multiple times in advance for initial key generation and acquires reliability information and response data generated with the highest probability by majority decision.

FIG. 25 is used to illustrate correlation decoding that uses reliability to perform decision. The following describes correlation decoding that uses reliability to perform decision with reference to FIG. 25.

According to this correlation decoding, in advance, low reliability (small weight) is assigned to a bit that is likely to cause an error, and high reliability is assigned to a bit that is unlikely to cause an error. Before reliability is assigned to a bit, the component of the bit is changed from 1 to −1 or 0 to +1. Based on the resulting components, calculations are performed. Instead of selecting a codeword that produces the smallest humming distance (HD) from candidates, an inner product is calculated between a candidate codeword and a vector with reliability, and a codeword that produces the largest result is selected as the correct codeword. In the drawing, the expressions using (x) represent multiplication between the components.

For example, when the correct codeword is (+1, −1, +1, −1) or (+1, +1, +1, +1) and an output including errors is (+1, +1, +1, +1), both of the candidates produce an HD of 1 bit and it cannot be decided which one is the correct codeword without reliability information. If, however, data (+5, +1, +5, −5), which indicates that the second bit is highly likely to cause error, is given as reliability, the codeword (+1, −1, +1,−1), in which the second bit is erroneous, can be determined to be the correct codeword.

Figure 26A:
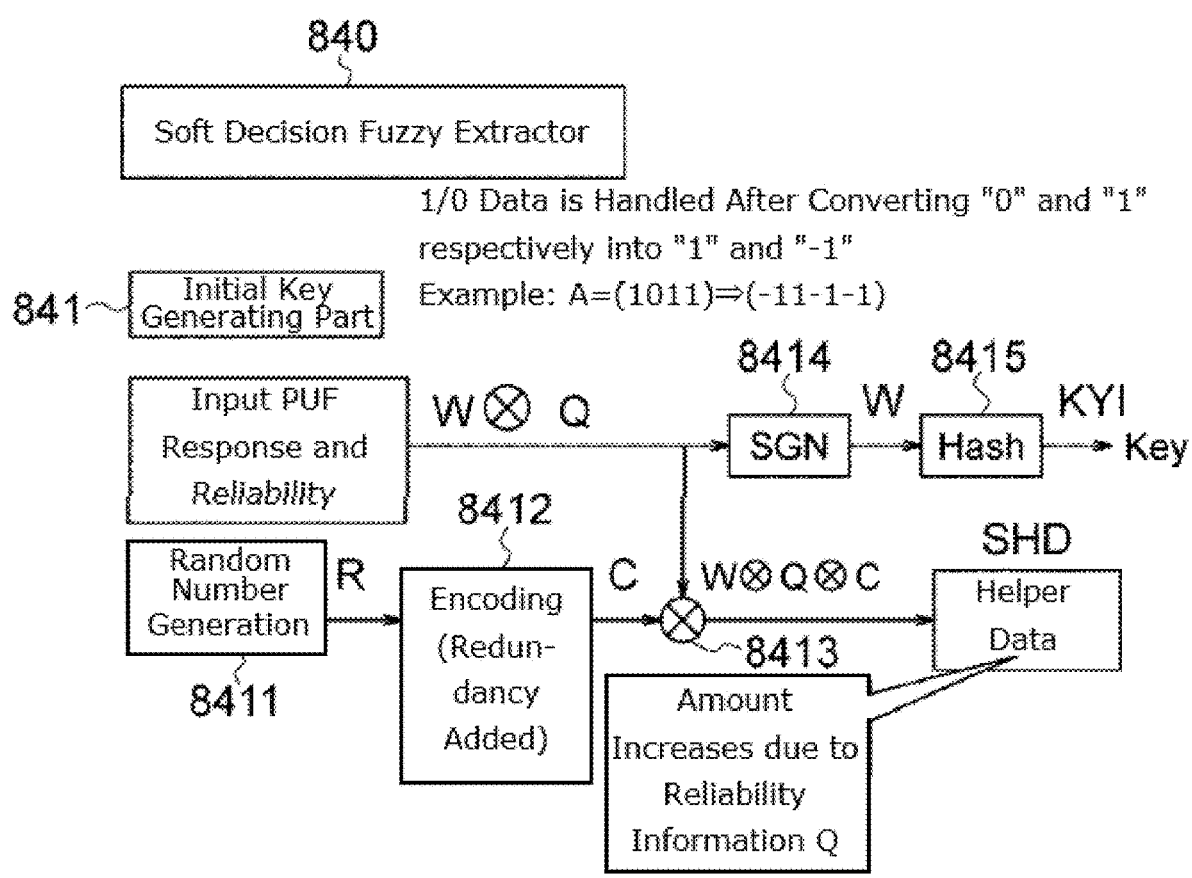
FIGS. 26A and 26B show an example configuration of a soft decision fuzzy extractor using correlation decoding as a comparative example.
Figure 26B:
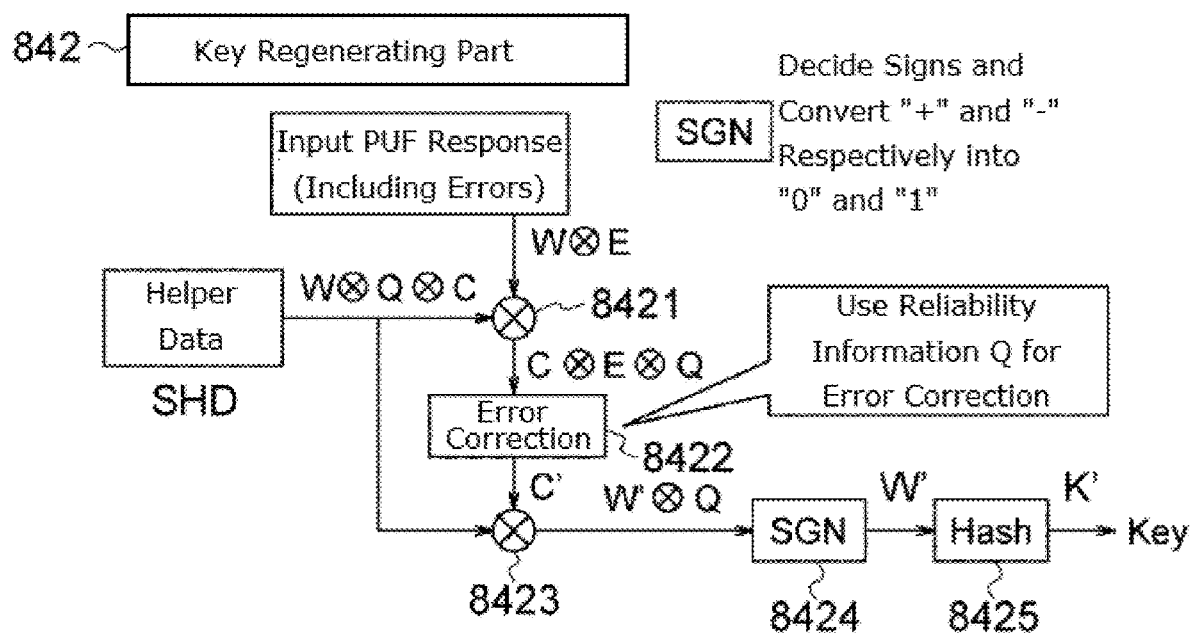

FIGS. 26A and 26B show an example configuration of a soft decision fuzzy extractor using correlation decoding as a comparative example. A fuzzy extractor 840 shown in FIGS. 26A and 26B includes an initial key generating part 841 shown in FIG. 26A and a key regenerating part 842 shown in FIG. 26B.

As shown in FIG. 26A, the initial key generating part 841 includes a random number generator 8411 formed by, for example, a ring oscillator (RNG), an encoding part 8412, an exclusive OR circuit (XOR) 8413, a code converting part 8414 and a first hash part (Hash) 8415.

When generating an initial key, the initial key generating part 841 receives, as input data, data W(x)Q which is obtained by performing a multiplication on the respective components of the input data W and the reliability information Q. This means that the data W is not 1/0 data but −1/+1 data. In the following description, the code means −1/+1 data. When an initial key is generated, the input data W(x)Q is converted into 1/0 data by the code converting part 8414, and the result is input into the first hash part 8415. The first hash part 8415 generates an initial key KYI based on the input data W. In the initial key generating part 841, the random number R generated by the random number generator 8411 is used to generate a codeword C of an error correction code by the encoding part 8412, and the codeword C is fed to the XOR 8413. The XOR 8413 calculates an exclusive OR between the input data W(x)Q and the codeword C, so that a 1/0 bit string or helper data SHD (W(x)Q(x)C) is generated.

As shown in FIG. 26B, the key regenerating part 842 includes a first multiplier 8421, an error correcting part 8422, a second multiplier 8423, a code converting part (SGN) 8424, and a second hash part (Hash) 8425.

In the key regenerating part 842, the first multiplier 8421 performs a multiplication on the variation information W(x)E, which is acquired as a response including an error when a key is regenerated, and the helper data W(x)Q(x)C, which includes the reliability information Q multiplied, to acquire data C(x)E(x)Q and feeds the data C(x)E(x)Q to the error correcting part 8422. Here, the helper data W(x)C is also provided as −1/1 data, which is obtained by converting the 1/0 data, in order to be compatible with soft decision. The error correcting part 8422 decodes the data C(x)E(x)Q using correlation decoding using the reliability information Q to acquire an estimated codeword C, and feeds the estimated codeword C' to the second multiplier 8423. The codes are converted such that "0" and "1" are respectively replaced with "1" and "−1" in order to calculate an inner product in relation to the correlation decoding used for this soft decision. The second multiplier 8423 performs a multiplication on the estimated codeword C' provided by the error correcting part 8422 and the helper data W(x)Q(x)C to acquire estimated variation information W'(x)Q and feeds the estimated variation information W'(x)Q to the code converting part 8424. The code converting part 8424 converts the −1/1 data back into 1/0 data, and feeds the result to the second hash part 8425. The second hash part 8425 subjects the estimated variation information W' to a hash function to acquire a hash value and outputs the hash value as a regenerated key. If C'=C, the regenerated key K' matches the initial key K, so that a unique PUF key is restored.

The following describes the correlation decoding used for the soft decision. As described above, the codes are converted such that "0" and "1" are respectively replaced with "1" and "−1" in order to calculate an inner product later. As shown in Table 3, a small weight is assigned to a bit that is likely to be inverted, and a large weight is given to a bit that is unlikely to be inverted. The acquired codes are weighted, inner products are calculated between the codes, and the code with the highest inner product is decided to be the correct code.

FIGS. 32 and 33 show examples that the true code can be found even if three bits are inverted at most. The inverted bits make negative contribution to the calculation of the inner product. The contribution made by the bits likely to be inverted, however, have a small weight. Thus, the negative contribution is small relative to the positive contribution made by the not-inverted bits. Accordingly, the true code is highly likely to take the largest inner product.

The above conventional approach has higher correcting capability than ordinary hard decision fuzzy extractor, but requires reliability information to be preserved in helper data. Therefore, the preserved data disadvantageously occupies an increased capacity.

On the other hand, the fuzzy extractor 820 relating to the present embodiment, which is configured to perform soft decision and employs reliability information Q when a key is regenerated and thus has high correcting capability, can estimate, each time the CIS-PUF generates a PUF response, whether a bit is unstable based on the difference between the average outputs (ΔVout) of the corresponding source follower transistors SF-Tr at the same time. With these characteristics, the CIS-PUF can produce reliability with a single attempt (single image). For this reason, unlike a conventional soft decision fuzzy extractor 840, the fuzzy extractor 820 does not necessarily need to generate large-size helper data with reliability when generating an initial key and alternatively can generate a PUF response with reliability each time a key is regenerated. Furthermore, the reliability can allow the fuzzy extractor 820 to have higher correcting capability than a hard decision fuzzy extractor 830.

<Evaluation based on Actual Data>

The following shows the evaluation of the error correcting capability based on the results of correcting actual data containing error bits. The following first mentions the ratio of error bits in a response and then describes the correcting capability achieved for each number of error bits in a response.

<Actual Data and Error Bit Analysis>

In order to apply the novel soft decision fuzzy extractor relating to the embodiment to a CIS-PUF, the actually achieved correcting capability is evaluated using actual data. As the actual data, output data from five chips corresponding to 100 attempts (100 images) was prepared. For the evaluation, as described above, first-order Reed-Muller codes (RM codes) are used by the soft decision fuzzy extractor as the error correction codes. This type of codes is relatively simply structured and enables efficient encoding. Therefore, first-order Reed-Muller codes are suitably used to examine the fuzzy extractor. Here, a small-scale RM (8,4,4) code is used from among first-order RM codes. According to this code, 4 information bits is used to generate an 8-bit codeword, and codewords have at least 4-bit humming distance (HD). The code is thus capable of correcting 1 error bit of 8 bits with an entropy of 4 bits. In order to use the RM(8,4,4) code, the probability that a 8-bit PUF response includes n error bits was calculated.

The evaluation is done using 1/0 data having random noise eliminated as much as possible, which is generated by superimposing output data of 100 attempts on a PUF response used to generate an initial key, which is a reference response. The humming distance (HD) between this reference data and the 1/0 data produced using each one of the 100 images is calculated to obtain the number of error bits. In order to calculate the error bits included in every 8 bits, a response of 1,920×270 bits from one chip is partitioned every 8 bits or into 64,800 blocks, and the calculation is performed on 5 (chips)×64,800 (blocks)×100 (attempts)=approximately 32 M.

Figure 27:
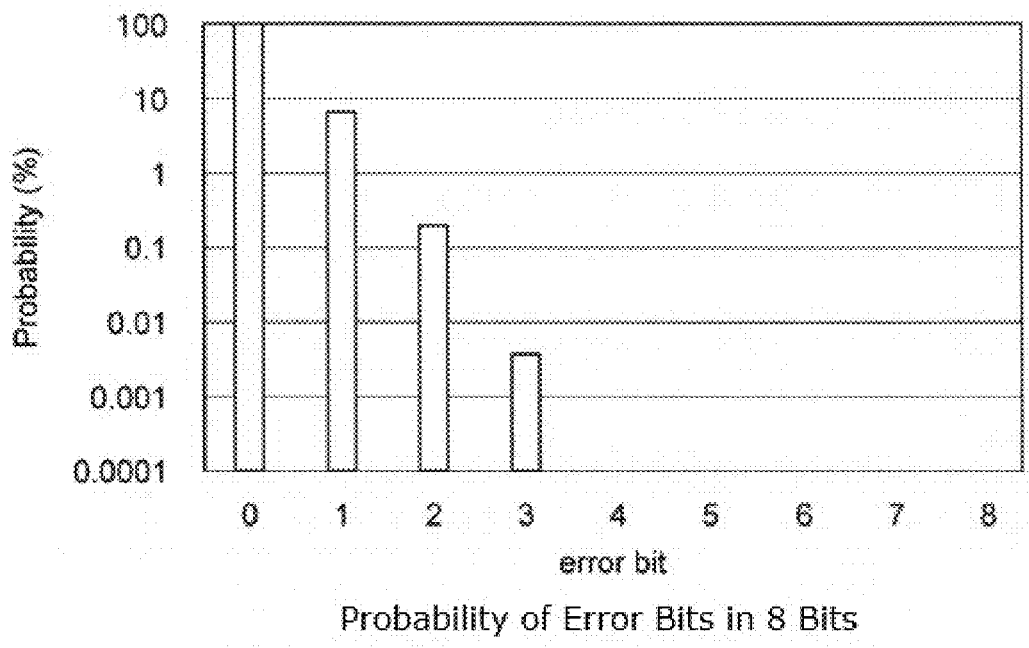
FIG. 27 shows the result of measuring error bits.

FIG. 27 shows the result of measuring error bits. As is shown in FIG. 27, when a CIS-PUF response is partitioned every 8 bits, the number of error bits is 0 or 1 in most of the blocks and is at most three.

<Error Correcting Capability when Novel Soft Decision Fuzzy Extractor of Present Embodiment is Used>

A response resulting from the above-described error bit analysis for one image or attempt is actually fed to the fuzzy extractor and it is confirmed whether correction is successfully performed.

Figure 28:
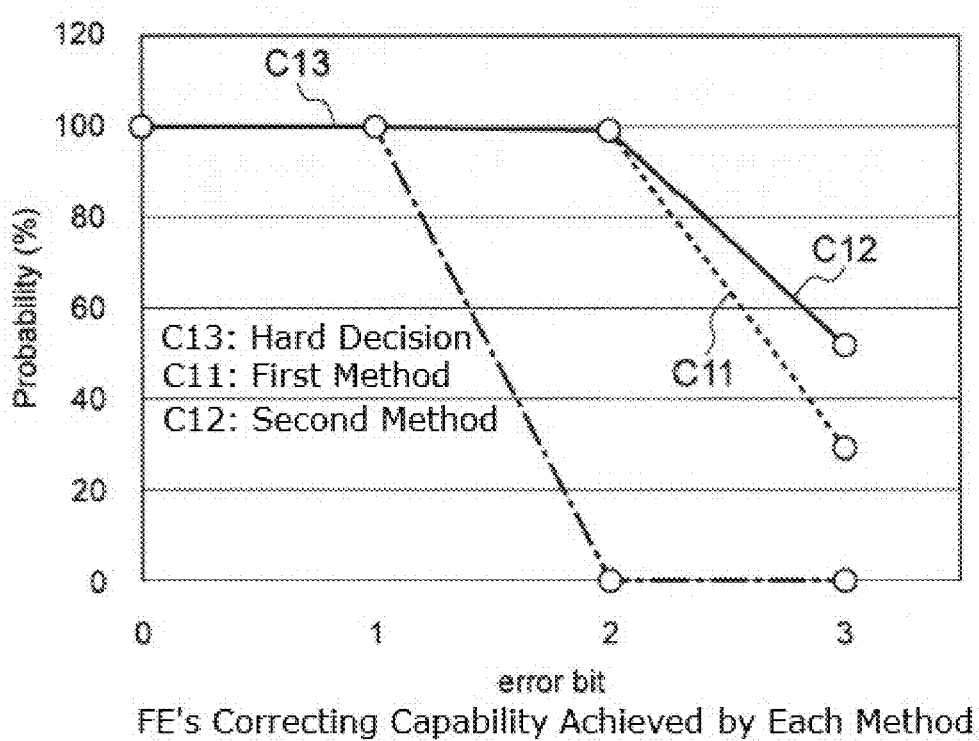
FIG. 28 illustrates the error correcting capability of the first and second methods of setting reliability relating to embodiments of the present invention and that of a comparative example or a decision method using a common hard decision fuzzy extractor.

FIG. 28 illustrates the error correcting capability of the first and second methods of setting reliability relating to the present embodiment and that of a comparative example or a decision method using a common hard decision fuzzy extractor. A response was fed to three types of fuzzy extractors, namely, a hard decision fuzzy extractor and fuzzy extractors employing the first and second reliability setting methods relating to the present embodiment. FIG. 28 shows the probability of successful correction when 8 bits includes n error bits. In FIG. 28, a characteristic curve C11 represents how the error bits is related to the probability when the first reliability setting method is employed, a characteristic curve C12 represents how the error bits is related to the probability when the second reliability setting method is employed, and a characteristic curve C13 represents how the error bits is related to the probability, when the hard decision method, which is a comparative example, is employed.

FIG. 28 reveals that the hard decision method is only capable of correcting 1 error bit but that the novel soft decision methods relating to the present embodiment can achieve improved correcting capability. The novel soft decision fuzzy extractors can almost certainly correct two error bits when employing the RM(8,4,4) code, which can only correct one error bit at most when used in the hard decision and even achieves success in correcting 3 error bits with some probability. Furthermore, it has been proved that the second reliability setting method, which takes into consideration the shift of the first difference ΔVout_get caused by random noise, can achieve improved correcting capability when compared with the case where the shift is not taken into consideration. According to the results shown in FIG. 28, there is still a concern about the correcting capability for three error bits. However, the probability of the error bits included in the 8 bits of the CIS-PUF response shown in FIG. 27 can suggest that the novel soft decision fuzzy extractor relating to the present embodiment may fail to correct the error bits but can regenerate a correct key by repeatedly performing the key regeneration multiple times.

As described above, the soft decision fuzzy extractor 820 relating to the present embodiment, which exhibits high correcting capability due to the reliability information Q used to regenerate a key, can estimate whether a bit is unstable based on the difference in average output between the source follower transistors SF-Tr corresponding to the bit each time the CIS-PUF generates a PUF response. With these characteristics, the CIS-PUF can produce reliability with a single attempt (single image). For this reason, unlike a conventional soft decision fuzzy extractor 840, the fuzzy extractor 820 does not necessarily need to generate large-size helper data with reliability when generating an initial key and alternatively can generate a PUF response with reliability each time a key is regenerated. Furthermore, the reliability can allow the fuzzy extractor 820 to have higher correcting capability than a hard decision fuzzy extractor 830.

As described above, the present embodiment does not need to append reliability to helper data or measure more than one response to acquire reliability information, can thus prevent an increase in the stored data in the fuzzy extractor when an initial key is generated, can generate unique and highly confidential response data and resultantly can certainly prevent forgery and falsification of images.

According to the above-described example, the key generating part 82 generates a unique key based on the variation information of the pixels or reading circuit 40. The key generating part 82 can be also configured to generate unique keys based on different pieces of variation information and perform a logical operation between the generated unique keys to acquire a final unique key. For example, the following configuration is also possible.

The key generating part 82 has a first function of generating a first unique key using variation information of the ADC 41, the amplifier (AMP) 42, or the S/H circuit 43 of the reading circuit 40 and a second function of generating a second unique key using the output from the SRAM of the column memory 45 of the reading circuit 40, and performs a logical operation on the first unique key generated by the first function and the second unique key generated by the second function to generate a final unique key.

The above configuration is also applicable to the pixel variation information.

The integrating part 85 may be configured to have a function of hierarchically masking the image using the key information to be integrated. Alternatively, the integrating part 85 may be configured to have a function of embedding an electronic watermark in the image using the key information to be integrated.

In the present embodiment, the individual constituents of the solid-state imaging device 10 can be contained in the same package.

When the Silicon in Package (SiP) is employed to seal the solid-state imaging device (CIS) 10 and an image signal processor (ISP) in the same package, the signal processing to generate keys and identification data may be completed within the package, so that the identification data can be generated without outputting the unique key data outside the package.

When the System on Chip (SoC) is used to include an image sensor and a signal processing circuit in the same chip, the signal processing to generate keys and identification data is completed within the chip, so that the identification data can be generated without outputting the unique key data outside the chip.

The solid-state imaging device 10 relating to the present embodiment can be configured to have driving timing to accumulate leak current and the like over a long duration, independently from normal reading driving timing, as described above. The full-scale voltage of the analog amplifier, digital amplifier or ADC may be reduced, and the accumulated leak voltage may be exaggerated and output. Furthermore, data resulting from a plurality of rows or frames may be averaged or added together to reduce the random noise component.

As the variation information CFLC of the constituent circuit of the reading circuit 40, the information acquiring part 81 can employ the variation information of the ADC. Alternatively, as the variation information CFLC of the constituent circuit of the reading circuit 40, the information acquiring part 81 can employ the variation information of the amplifier (AMP). As another alternative, the information acquiring part 81 can employ variation information of the S/H circuit as the variation information CFLC of the constituent circuit of the reading circuit 40. Furthermore, the information acquiring part 81 can employ output (variation) information of the SRAM of the column memory, as the variation information CFLC of the constituent circuit of the reading circuit 40.

The solid-state imaging devices 10 and 10A described above can be applied, as an imaging device, to electronic apparatuses such as digital cameras, video cameras, mobile terminals, surveillance cameras, and medical endoscope cameras.

Figure 29:
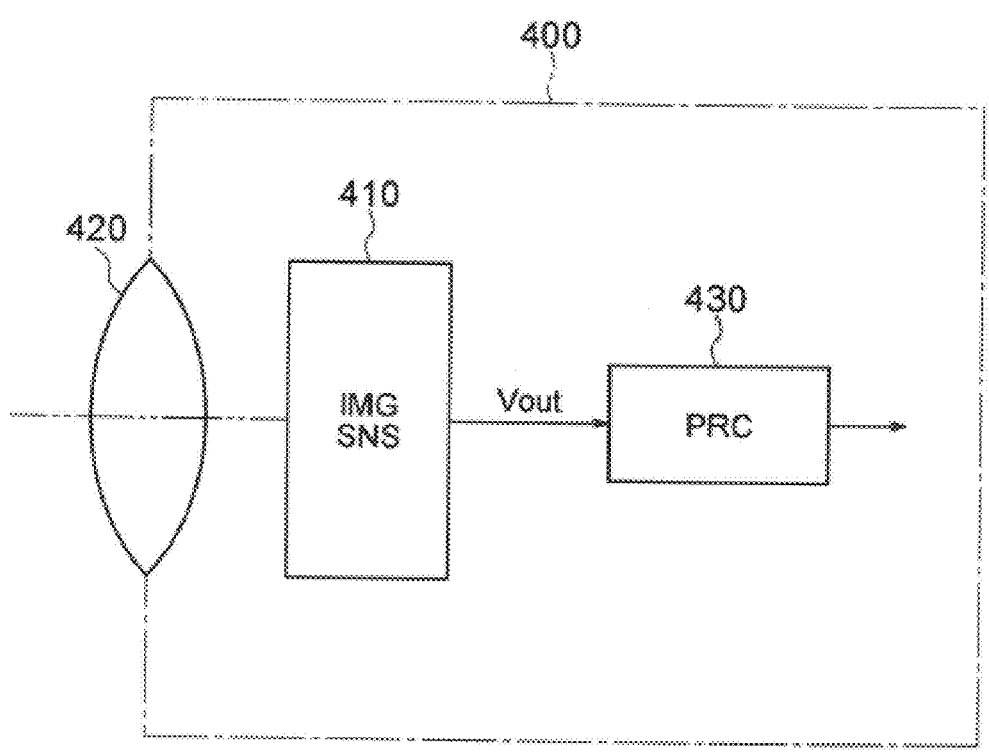
FIG. 29 shows an example configuration of an electronic apparatus to which the solid-state imaging devices relating to the embodiments of the present invention can be applied.

FIG. 29 shows an example of the configuration of an electronic apparatus including a camera system to which the solid-state imaging device according to the embodiments of the present invention is applied.

The electronic apparatus 400 includes a CMOS image sensor (IMGSNS) 410, which can be configured based on the solid-state imaging devices 10 and 10A relating to the embodiments of the invention, as shown in FIG. 29. Further, the electronic apparatus 400 includes an optical system (such as a lens) 420 for redirecting the incident light to pixel regions of the CMOS image sensor 410 (to form a subject image). The electronic apparatus 400 includes a signal processing circuit (PRC) 430 for processing output signals of the CMOS image sensor 410.

The signal processing circuit 430 performs predetermined signal processing on the output signals of the CMOS image sensor 410. The image signals processed in the signal processing circuit 430 can be handled in various manners. For example, the image signals can be displayed as a video image on a monitor having a liquid crystal display, or the image signals can be printed by a printer or recorded directly on a storage medium such as a memory card.

As described above, a high-performance, compact, and low-cost camera system can be provided that includes the solid-state imaging device 10, 10A as the CMOS image sensor 410. Further, it is possible to produce electronic apparatuses such as surveillance cameras and medical endoscope cameras that are used for applications where cameras are required to be installed under restricted conditions such as the installation size, number of connectable cables, cable length, and installation height.

What is claimed is:

1. A solid-state imaging device comprising:
a pixel part having a plurality of pixels arranged in a matrix pattern, the pixels having a photoelectric converting function;
a reading part for reading a pixel signal from the pixel part; and
a response data generating part including a fuzzy extractor, the response data generating part generating response data including a unique key in association with at least one selected from the group consisting of variation information of the pixels and variation information of the reading part,
wherein, when regenerating a key, the response data generating part generates a unique key using helper data acquired in generation of an initial key, variation information acquired in the regeneration of the key, and reliability information determined based on the variation information acquired in the regeneration of the key;
wherein the fuzzy extractor includes:
an initial key generating part for generating the initial key and the helper data based on variation information acquired as a response when the initial key is generated; and
a key regenerating part for, when a key is regenerated, generating a unique key in a soft-decision manner using the helper data acquired in generation of the initial key, variation information acquired as a response including an error when the key is regenerated, and reliability information determined based on the variation information acquired in the regeneration of the key;
wherein the initial key generating part includes:
a first hash part for subjecting the variation information W, which is acquired as a response, to a hash function (Hash) to acquire a hash value and outputting the hash value as the initial key; and
an exclusive OR part for performing an exclusive OR operation on the acquired variation information W and a codeword C of an error correction code generated using a random number and output a result of the exclusive OR operation (WxorC) as the helper data;
wherein the key regenerating part includes:
a reliability information acquiring part for acquiring the reliability information Q determined based on the variation information acquired as a response including an error when the key is regenerated;
a first multiplier for performing a multiplication on the reliability information Q and the variation information W(x)E acquired as a response including an error when the key is regenerated, to acquire first data W(x)E(x)Q;
a second multiplier for performing a multiplication on the helper data W(x)C and the first data including the reliability information Q to acquire second data C(x)E(x)Q resulting from a multiplication on the codeword C of the error correction code, an error component E and the reliability information Q;
an error correcting part for decoding the second data C(x)E(x)Q using correlation decoding using the reliability information Q to acquire an estimated codeword C';
a third multiplier for performing a multiplication on the estimated codeword C' provided by the error correcting part and the helper data W(x)C to acquire estimated variation information W'; and
a second hash part for subjecting the estimated variation information W' to a hash function (Hash) to acquire a hash value and outputting the hash value as a regenerated key.

2. The solid-state imaging device according to claim 1, wherein the variation information is acquired as a multi-bit digital value in which each bit corresponds to two output values, and
wherein the response data generating part uses as the reliability information the two output values of the variation information.

3. The solid-state imaging device according to claim 2, wherein a difference between the two output values of the variation information is used to determine likelihood of bit inversion, and
wherein the response data generating part determines the reliability information based on the difference between the two output values of the variation information acquired in the regeneration of the key.

4. The solid-state imaging device according to claim 2, wherein the response data generating part assumes that a first difference between the two output values of the variation information acquired in the regeneration of the key is the same as a second difference between averages of the output values, and sets the reliability under a postulate that, as the first difference increases, an area of an overlap between distributions of the two output values decreases and a likelihood of bit inversion decreases and that, as the first difference decreases, the area of the overlap between the distributions of the two output values increases and the likelihood of bit inversion increases.

5. The solid-state imaging device according to claim 4, wherein the response data generating part sets the reliability such that the reliability takes a minimum when the area of the overlap between the distributions of the two output values, which is estimated based on the first difference, takes a maximum and the reliability increases toward a maximum as the area of the overlap decreases.

6. The solid-state imaging device according to claim 4, wherein the response data generating part sets the reliability such that the reliability takes a maximum when the area of the overlap between the distributions of the two output values, which is estimated based on the first difference, takes a minimum and the reliability decreases toward a minimum as the area of the overlap increases.

7. The solid-state imaging device according to claim 2, wherein under such assumption that a first difference between the two output values of the variation information acquired in the regeneration of the key is different from a second difference between averages of the output values, that acquired values vary among respective attempts, and that there are both cases where the first difference is larger than the second difference and where the first difference is smaller than the second difference, the response data generating part sets the reliability while taking into consideration how far the first difference is different from the second difference.

8. The solid-state imaging device according to claim 7, wherein the response data generating part sets the reliability under such assumption that the first difference is within a range of +−α of the second difference and while taking into consideration how far the first difference is different from the second difference.

9. The solid-state imaging device according to claim 1, wherein if the estimated codeword C' provided by the error correcting part matches the codeword C generated when the initial key is generated, the regenerated key matches the initial key.

10. The solid-state imaging device according to claim 1, wherein, in the key regenerating part, the variation information W(x)E acquired as a response including an error when the key is regenerated and the helper data W(x)C are fed after converted from 1/0 data into −1/1 data, and the −1/1 data is converted back into 1/0 data before input into the second hash part.

11. The solid-state imaging device according to claim 1, wherein the pixels include:
   a photoelectric conversion element for storing therein, in a storing period, charges generated by the photoelectric conversion;
   a transfer element for transferring, in a transfer period, the charges stored in the photoelectric conversion element;
   a floating diffusion to which the charges stored in the photoelectric conversion element are transferred through the transfer element;
   a source follower element for converting the charges in the floating diffusion into a voltage signal with a gain determined by the quantity of the charges; and
   a reset element for resetting the floating diffusion to a predetermined potential.

12. The solid-state imaging device according to claim 11, wherein the pixel part has a pixel sharing configuration in such a manner that one floating diffusion, one source follower element and one reset element are shared by a plurality of photoelectric conversion elements and a plurality of transfer elements.

13. The solid-state imaging device according to claim 11, wherein a clip circuit is provided at an end of an array of the pixels for limiting a pixel output voltage amplitude.

14. A method for driving a solid-state imaging device including:
   a pixel part having a plurality of pixels arranged in a matrix pattern, the pixels having a photoelectric converting function; and
   a reading part for reading a pixel signal from the pixel part,
   wherein the method comprises steps of:
   acquiring at least one selected from the group consisting of variation information of the pixels and variation information of the reading part; and
   generating response data including a unique key in association with the variation information acquired in the acquiring step, using a fuzzy extractor, and
   wherein, in the response data generating step, when a key is regenerated, a unique key is generated using helper data acquired in generation of an initial key, variation information acquired in the regeneration of the key, and reliability information determined based on the variation information acquired in the regeneration of the key;
   wherein the fuzzy extractor includes:
      an initial key generating part for generating the initial key and the helper data based on variation information acquired as a response when the initial key is generated; and
      a key regenerating part for, when a key is regenerated, generating a unique key in a soft-decision manner using the helper data acquired in generation of the initial key, variation information acquired as a response including an error when the key is regenerated, and reliability information determined based on the variation information acquired in the regeneration of the key;
   wherein the initial key generating part includes:
      a first hash part for subjecting the variation information W, which is acquired as a response, to a hash function (Hash) to acquire a hash value and outputting the hash value as the initial key; and
      an exclusive OR part for performing an exclusive OR operation on the acquired variation information W and a codeword C of an error correction code generated using a random number and output a result of the exclusive OR operation (WxorC) as the helper data;
   wherein the key regenerating part includes:
      a reliability information acquiring part for acquiring the reliability information Q determined based on the variation information acquired as a response including an error when the key is regenerated;
      a first multiplier for performing a multiplication on the reliability information Q and the variation information W(x)E acquired as a response including an error when the key is regenerated, to acquire first data W(x)E(x)Q;
      a second multiplier for performing a multiplication on the helper data W(x)C and the first data including the reliability information Q to acquire second data C(x)E(x)Q resulting from a multiplication on the codeword C of the error correction code, an error component E and the reliability information Q;
      an error correcting part for decoding the second data C(x)E(x)Q using correlation decoding using the reliability information Q to acquire an estimated codeword C';
      a third multiplier for performing a multiplication on the estimated codeword C' provided by the error correcting part and the helper data W(x)C to acquire estimated variation information W'; and
      a second hash part for subjecting the estimated variation information W' to a hash function (Hash) to acquire a hash value and outputting the hash value as a regenerated key.

15. An electronic apparatus comprising:
   a solid-state imaging device; and
   an optical system for forming a subject image on the solid-state imaging device,
   wherein the solid-state imaging device includes:
      a pixel part having a plurality of pixels arranged in a matrix pattern, the pixels having a photoelectric converting function;
      a reading part for reading a pixel signal from the pixel part; and
      a response data generating part including a fuzzy extractor, the response data generating part generating response data including a unique key in association with at least one selected from the group consisting of variation information of the pixels and variation information of the reading part, and
   wherein the response data generating part generates, when regenerating a key, a unique key using helper data acquired in generation of an initial key, variation information acquired in the regeneration of the key, and reliability information determined based on the variation information acquired in the regeneration of the key;

wherein the fuzzy extractor includes:
- an initial key generating part for generating the initial key and the helper data based on variation information acquired as a response when the initial key is generated; and
- a key regenerating part for, when a key is regenerated, generating a unique key in a soft-decision manner using the helper data acquired in generation of the initial key, variation information acquired as a response including an error when the key is regenerated, and reliability information determined based on the variation information acquired in the regeneration of the key;

wherein the initial key generating part includes:
- a first hash part for subjecting the variation information W, which is acquired as a response, to a hash function (Hash) to acquire a hash value and outputting the hash value as the initial key; and
- an exclusive OR part for performing an exclusive OR operation on the acquired variation information W and a codeword C of an error correction code generated using a random number and output a result of the exclusive OR operation (WxorC) as the helper data;

wherein the key regenerating part includes:
- a reliability information acquiring part for acquiring the reliability information Q determined based on the variation information acquired as a response including an error when the key is regenerated;
- a first multiplier for performing a multiplication on the reliability information Q and the variation information W(x)E acquired as a response including an error when the key is regenerated, to acquire first data W(x)E(x)Q;
- a second multiplier for performing a multiplication on the helper data W(x)C and the first data including the reliability information Q to acquire second data C(x)E(x)Q resulting from a multiplication on the codeword C of the error correction code, an error component E and the reliability information Q;
- an error correcting part for decoding the second data C(x)E(x)Q using correlation decoding using the reliability information Q to acquire an estimated codeword C';
- a third multiplier for performing a multiplication on the estimated codeword C' provided by the error correcting part and the helper data W(x)C to acquire estimated variation information W'; and
- a second hash part for subjecting the estimated variation information W' to a hash function (Hash) to acquire a hash value and outputting the hash value as a regenerated key.

* * * * *